(12) United States Patent
Dautz et al.

(10) Patent No.: US 10,853,759 B2
(45) Date of Patent: Dec. 1, 2020

(54) COMPARTMENT-SPECIFIC ACCESS AUTHORIZATION INFORMATION

(71) Applicants: Christoph Dautz, Bonn (DE); Klaus Ebner, Bornheim (DE); Marius Flesch, Cologne (DE)

(72) Inventors: Christoph Dautz, Bonn (DE); Klaus Ebner, Bornheim (DE); Marius Flesch, Cologne (DE)

(73) Assignee: Deutsche Post AG, Bonn (DE)

( * ) Notice: Subject to any disclaimer, the term of this patent is extended or adjusted under 35 U.S.C. 154(b) by 31 days.

(21) Appl. No.: 15/822,634

(22) Filed: Nov. 27, 2017

(65) Prior Publication Data

US 2018/0158021 A1    Jun. 7, 2018

(30) Foreign Application Priority Data

Dec. 7, 2016  (DE) .................. 10 2016 123 713

(51) Int. Cl.
*G06Q 10/08* (2012.01)
*G07F 17/12* (2006.01)
(Continued)

(52) U.S. Cl.
CPC ..... *G06Q 10/0836* (2013.01); *G07C 9/00571* (2013.01); *G07C 9/00896* (2013.01);
(Continued)

(58) Field of Classification Search
CPC .......... G06Q 10/0836; G07C 9/00103; G07C 9/00571; G07C 9/00896; G07F 17/12
See application file for complete search history.

(56) References Cited

U.S. PATENT DOCUMENTS

2014/0035721 A1   2/2014  Heppe et al.
2015/0179006 A1   6/2015  Von Zurmuehlen et al.
(Continued)

FOREIGN PATENT DOCUMENTS

CN       101341691 A      1/2009
CN       104584026 A      4/2015
(Continued)

*Primary Examiner* — Curtis B Odom
(74) *Attorney, Agent, or Firm* — Reinhart Boerner Van Deuren P.C.

(57) ABSTRACT

The disclosure relates to a method comprising outputting access authorization information, which is a necessary condition for access to a compartment of a compartment system. The specific compartment is known, and the access authorization information is generated at least using information identifying the compartment, such that the compartment is determinable by the compartment system using the access authorization information. The compartment system may be stateless with respect to the determination of the compartment using the access authorization information. The access authorization information and the compartment system may be configured in a way such that the compartment system does not need to receive any further information in order to perform a check to determine whether access to the compartment can be granted on the basis of the access authorization information and/or the compartment system only obtains information from that device from which the compartment system obtains the access authorization information.

38 Claims, 8 Drawing Sheets

(51) Int. Cl.
*G07C 9/00* (2020.01)
*G07C 9/27* (2020.01)
*A47G 29/14* (2006.01)
*A47G 29/12* (2006.01)

(52) U.S. Cl.
CPC .............. *G07C 9/27* (2020.01); *G07F 17/12* (2013.01); *A47G 29/1201* (2013.01); *A47G 29/141* (2013.01); *G07C 9/00912* (2013.01); *G07C 2009/0088* (2013.01); *G07C 2009/00865* (2013.01)

(56) References Cited

U.S. PATENT DOCUMENTS

2016/0300187 A1\* 10/2016 Kashi ................. G06Q 10/0836
2017/0287244 A1\* 10/2017 Jansen ................. A47G 29/141

FOREIGN PATENT DOCUMENTS

| CN | 105723425 A | 6/2016 |
|---|---|---|
| CN | 105793875 A | 7/2016 |
| DE | 10 2014 119 557 A1 | 6/2016 |
| WO | WO 2016/164577 A1 | 10/2016 |

\* cited by examiner

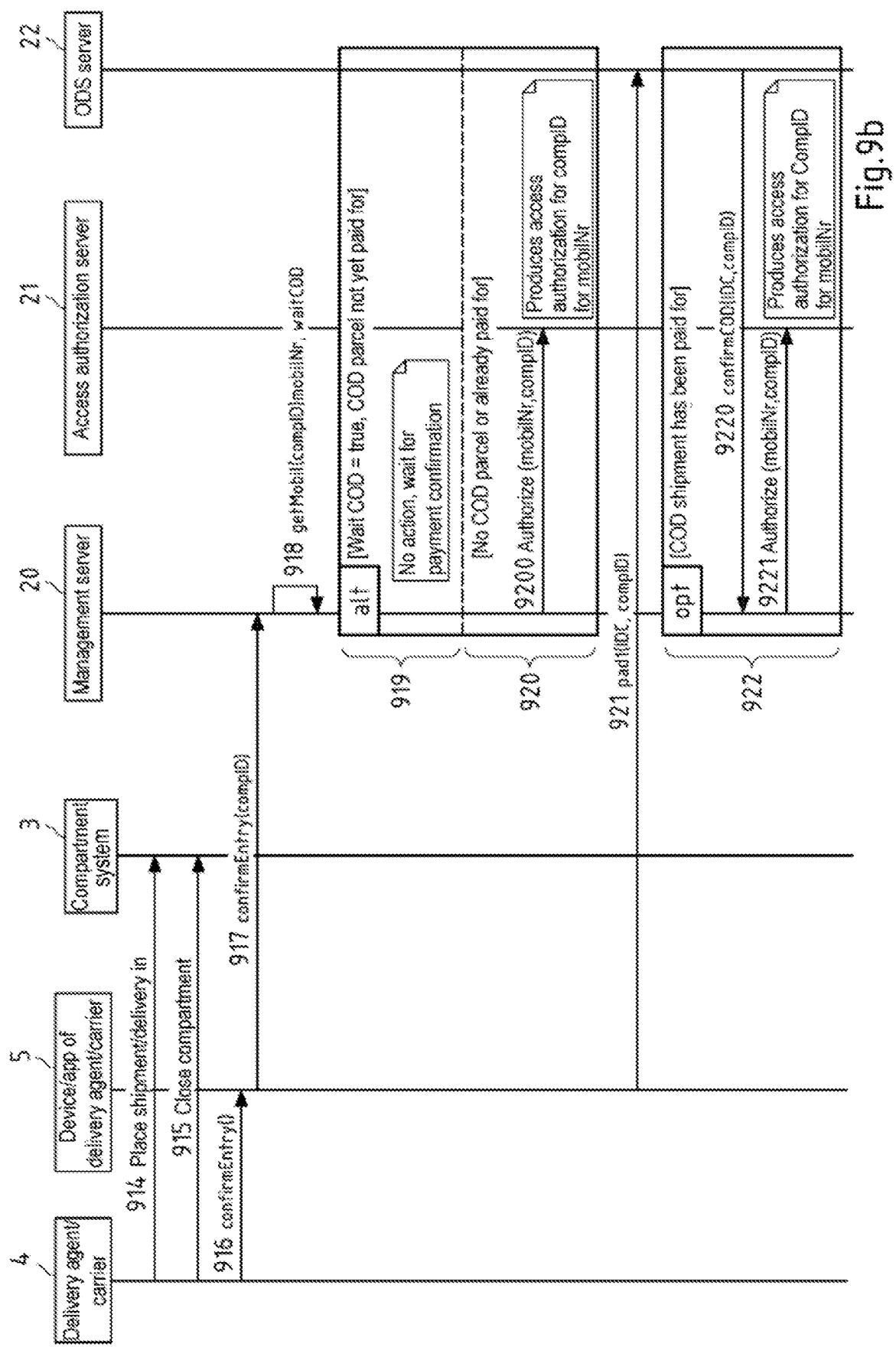

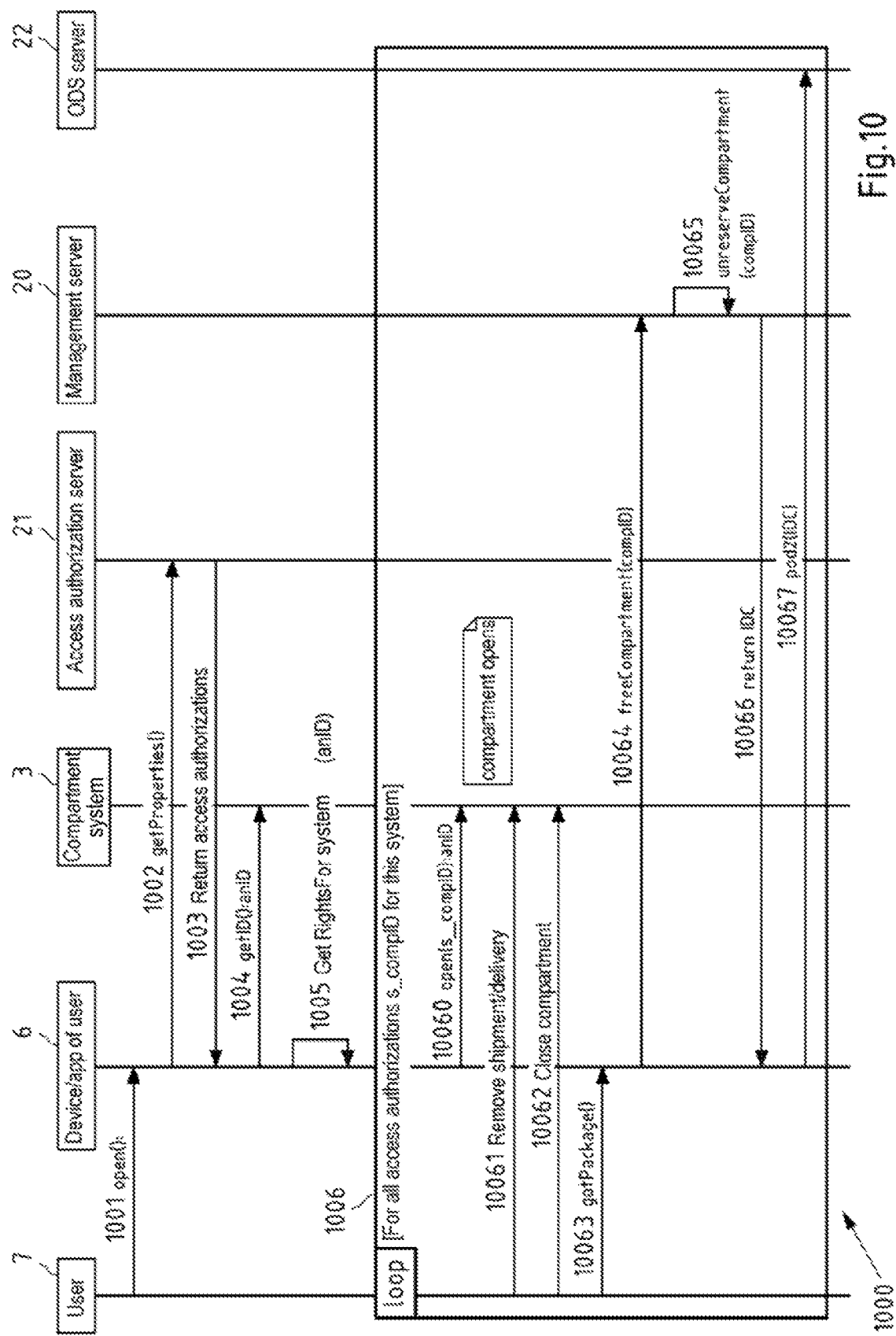

COMPARTMENT-SPECIFIC ACCESS AUTHORIZATION INFORMATION

CROSS-REFERENCE TO RELATED PATENT APPLICATION

This patent application claims priority to German Application No. 10 2016 123 713.2, filed Dec. 7, 2016, the entire teachings and disclosure of which are incorporated herein by reference thereto.

FIELD

Exemplary embodiments of the invention relate to the generation, provision and checking of access authorization information relating to a compartment system, particularly a compartment system for delivery or carrier services to put in and/or collect shipments.

BACKGROUND

Compartment systems are used diversely in the form of safe deposit box or parcel compartment systems, for example. An example of a parcel compartment system is the packing station from the applicant, to which a recipient can have shipments delivered. The shipment is placed into a compartment of a packing station in proximity to the recipient by the delivery agent, the compartment is sealed and the recipient is notified accordingly. The recipient can then open the compartment, for example using a code, and remove the shipment. The packing station obviates the need for the recipient to have to be at home for the delivery of a shipment. Furthermore, the packing station can be visited by the recipient at any time and the shipment removed, since removal of the shipment does not require personnel to be present.

To make the receipt of shipments even more convenient for the recipient, the applicant makes the delivery of shipments to a parcel box available as a further delivery variant. In terms of concept, a parcel box is in a similar form to a letterbox, that is to say associated with a recipient and located, in particular, directly at the residence or place of business of the latter, but provided with greater capacity. Both the delivery agent and the recipient can open the parcel box, e.g. using electronic keys. In one variant (for example for single-family houses), the parcel box may be associated with only one recipient and may then have only one parcel compartment, for example, but in another variant (for example for multiple-family houses or office buildings) it may also be associated with a plurality of recipients and then have a plurality of parcel compartments, for example. In this specification, the latter variant is also referred to as a parcel box system. In this case, the parcel compartments of a parcel box system can be associated with the recipients statically, for example as part of a registration process of the respective recipient. Advantageously, however, the association is made dynamically. In that case, it is particularly possible to exploit the fact that usually all the parcel compartments of a parcel box system are not used at the same time and the number of recipients can then be chosen to be greater than the number of parcel compartments in the parcel compartment system.

SUMMARY OF A FEW EXEMPLARY EMBODIMENTS OF THE INVENTION

Whether or not access to a compartment of a compartment system, such as a parcel box system, can be granted is usually checked on the basis of access authorization information that a person wishing to gain access to the compartment has provided, for example to the compartment system. It is conceivable for the fundamental authorization of a person, particularly the person generating the access authorization information, to gain access to a compartment of the compartment system to be expressed in the access authorization information, but for the information concerning the specific compartment to which the access authorization information relates to be stored either locally in the compartment system or centrally in a central system that controls a plurality of compartment systems. By way of example, the compartment system stores a table that reflects a respective current association between access authorization information and compartments (for example on the basis of identifiers respectively included in the access authorization information, e.g. personal identifiers that are then associated with respective compartments by storage in the table). The advantage of this approach is that the same access authorization information can be used, even if the compartment that a person is meant to access changes. It is then possible, by way of example, for the access authorization information to be stored once (for example on a portable electronic device, e.g. a key fob) and to be used for a plurality of access processes for different compartments of the compartment system. However, a drawback of this approach is that the association between access authorization information and compartments is then stored either in a central system or locally in the compartment system. In the case of the first alternative, determining the compartment for which a person is meant to be granted access on the compartment system requires the compartment system to communicate with the central system, which requires either a wired or wireless communication device, particularly a long-range communication device, such as e.g. a LAN (Local Area Network) interface or an interface for cellular mobile radio, on the compartment system. In the case of the second alternative (storage of the association between access authorization information and compartments locally in the compartment system), it is disadvantageous that the stored association can be lost during events such as power failure or other perturbations (e.g. crashing of the firmware or of the operating system of the compartment system, damage to the controller of the compartment system on account of vandalism or other mechanical effect) and it is then totally unclear which assignment authorization information is associated with which compartment. The compartments of the compartment system would then need to be emptied and reassociated with access authorization information. If the compartment system is a parcel compartment system, it would thus be necessary for all the shipments already delivered to compartments of the compartment system to be removed from the compartments and redelivered. Measures for failsafe storage of the association between access authorization information and compartments could counter such situations, but would increase the complexity and particularly the power consumption of the compartment system, which is undesirable, particularly in the case of compartment systems that are not connected to the power grid (for example compartment systems operated by battery and/or with solar cells).

A disadvantage of access authorization information that is valid for a longer period, for example several months or years, in order to be able to be used by a person for a plurality of access processes on the compartment system, is furthermore that, in the event of theft of a portable electronic unit on which the access authorization information is stored, it is possible for a compartment of the compartment system to be accessed by the thief at least until the access authorization information is disabled (in so far as this is actually possible).

The object of the present invention is to overcome one or more of the disadvantages described above.

According to a first exemplary aspect of the invention, a method is disclosed that comprises the following: generating and/or outputting access authorization information, the provision of which to a compartment system is a necessary condition for access to a compartment from a plurality of compartments of the compartment system to be granted by the compartment system. By way of example, the method is performed by an apparatus, or (jointly) by a system that comprises at least two apparatuses, for example such that one apparatus from the apparatuses performs the generating and the other of the apparatuses performs the outputting. The apparatus or one of the apparatuses may be a server for generating the access authorization information, for example. The apparatus or the apparatuses may be part of a central system (e.g. what is known as a back end), for example, that is at least involved in the management (e.g. compartment management or reservation) of a plurality of compartment systems, comprising the compartment system, and/or in the generation of the access authorization information.

According to a second exemplary aspect of the invention, a method is disclosed that comprises the following: obtaining access authorization information at a compartment system, wherein the obtaining of the access authorization information is a necessary condition for access to a compartment from a plurality of compartments of the compartment system to be granted by the compartment system. By way of example, the method is performed by the compartment system or an apparatus of the compartment system, for example by a processor of the compartment system, particularly by an access control apparatus.

According to a third exemplary aspect of the invention, a method is disclosed that comprises the following: obtaining access authorization information, the provision of which to a compartment system is a necessary condition for access to a compartment from a plurality of compartments of the compartment system to be granted by the compartment system, at a device of a person; and transferring the access authorization information to the compartment system or outputting the access authorization information to the person in order to enable the person to provide the access authorization information to the compartment system. The method is performed by the device of the person, for example.

According to each of these aspects of the invention, the following are furthermore respectively disclosed:

a computer program, comprising program instructions that cause a processor to perform and/or control the method according to the respective aspect of the invention when the computer program runs on the processor. In this specification, a processor is intended to be understood to mean, inter alia, control units, microprocessors, microcontrol units such as microcontrollers, digital signal processors (DSPs), application-specific integrated circuits (ASICs) or field programmable gate arrays (FPGAs). These can involve either all the steps of the method being controlled, or all the steps of the method being performed, or one or more steps being controlled and one or more steps being performed. By way of example the computer program may be distributable via a network such as the Internet, a telephone or mobile radio network and/or a local area network. The computer program may at least in part be software and/or firmware of a processor. Equally, it may at least in part be implemented as hardware. By way of example, the computer program may be stored on a computer-readable storage medium, e.g. a magnetic, electrical, optical and/or other kind of storage medium. By way of example, the storage medium may be part of the processor, for example a (nonvolatile or volatile) program memory of the processor or a part thereof. The storage medium may be a substantive or physical storage medium, for example.

An apparatus, configured to perform and/or control the method according to the respective aspect of the invention or comprising respective means for performing and/or controlling the steps of the method according to the respective aspect of the invention. This can involve either all the steps of the method being controlled, or all the steps of the method being performed, or one or more steps being controlled and one or more steps being performed. One of more of the means can also be implemented and/or controlled by the same unit. By way of example, one or more of the means may be formed by one or more processors.

An apparatus that comprises at least one processor and at least one memory that contains program code, wherein the memory and the program code are configured to cause, with the at least one processor, an apparatus to perform and/or control at least the method according to the respective aspect of the invention. This can involve either all the steps of the method being controlled, or all the steps of the method being performed, or one or more steps being controlled and one or more steps being performed.

These exemplary aspects of the present invention can have the properties described below, inter alia.

The compartment system comprises a plurality of compartments (that is to say more than one compartment or more than two compartments, for example). The compartments are configured to receive shipments (e.g. letters, parcels, packages), deliveries (e.g. washed laundry or laundry to be washed, meals from delivery services (e.g. a pizza or sushi service), etc.) or items (e.g. valuables, luggage, etc.), for example. The compartments are each sealable, for example by means of a respective door or shutter. By way of example, the compartments are substantially parallelepipedal receiving containers that have doors or shutters provided on one or more sides. By way of example, multiple compartments in the compartment system are arranged above one another and/or beside one another. By way of example, the compartment system can consist of one or more modules arranged beside one another, with one or more compartments in each module being arranged above one another. The respective doors of the compartments are then fixed on at the side, for example, and can be opened forward, for example. The compartments of the compartment system can all have the same size. Alternatively, at least some compartments of the compartment system can have different sizes. The sizes can match standard different sizes of shipments, deliveries or items (e.g. parcel sizes), for example. The compartment system can have compartments for letters (pigeonholes) and/or compartments for parcels (parcel compartments), for example. The pigeonholes each have the same size within the compartment system, for example, but two or more different sizes are also possible. The parcel compartments may be represented by just one identical size or by different sizes in the compartment system. The compartment system may be configured as a parcel compartment system or a combined pigeonhole and parcel compartment system for a multiple-family house or office building, for example.

Each of the compartments is provided with a respective lock. By way of example the lock of a compartment may be arranged in or on the compartment, for example on a door (e.g. also in the form of a shutter) of the compartment. If the lock is not arranged on the door (that is to say on a lateral wall of the compartment, for example), then it interacts with the door, for example, by virtue of a bolt being introduced into an opening in the door and pulled out again, for example. Alternatively, a hook fitted on the door may be introducible into an opening in the lock, for example, in order to be locked/unlocked there. If the lock is fitted to the door, for example, then it can interact, by way of example with the walls of the compartment, for example as a result of bolts being introduced into/pulled out of openings in the walls or as a result of a hook fitted to the walls being received in the lock, and appropriate locking/unlocking. The lock of a compartment can return to a locked position as standard, for example, and then be actuable only for unlocking purposes, for example. After the lock has been unlocked, it is then possible for the door of the compartment to be opened, for example. Since the lock automatically returns to the locked position, locking of the compartment can be achieved by closing the door, for example by virtue of a catch function of the lock being utilized when closing the door.

A compartment of the compartment system may be either open or closed. In the open state of the compartment, the lock of the compartment is unlocked. The door of the compartment can then be opened by a person without the use of force, for example, or is open. In the closed state of the compartment, the lock of the compartment is locked, on the other hand. The door of the compartment can then no longer be opened by a person who is not authorized to open it without the use of force, for example.

The lock of a respective compartment is controllable, for example, particularly in electronic form. In particular, at least the process of locking and/or unlocking the lock can be controlled. The lock of a compartment can be controlled by a lock control unit, for example, with either each lock having an associated lock control unit of its own or a (for example central) lock control unit controlling some (e.g. those of a module of the compartment system) or all locks of the compartment system. In the former case, multiple lock control units, for example all the lock control units or those of one or more modules of the compartment system, are controlled by a superordinate control unit, for example, whereas in the latter case there is respective wiring between the lock control unit and each of the locks controlled thereby, for example, with signals or applied voltages transmitted via respective wiring then being associated only with the respective lock to which the wiring leads, but not with other locks. Alternatively, the use of a bus to which the lock control unit and a plurality of locks are electrically connected is also conceivable. In that case, however, a unit for evaluating the control signals obtained by the bus is necessary in each lock, which makes the locks more complex and hence more expensive than in the case of the direct wiring.

A lock control unit (particularly the central lock control unit) is able not only to attend to the actuation of the lock or of the locks, for example, but also to check whether provided access authorization information provides authorization to access a compartment of the compartment system, and can accordingly grant access to the compartment (e.g. by unlocking the door of the compartment) or deny access to the compartment (e.g. by virtue of the door of the compartment not being unlocked).

The access authorization information is provided to the compartment system by a device of a person, for example, particularly a portable device of the person, for example by wired or wireless transfer (that is to say transmission, for example), for example by electromagnetic (with the special case of optical), electrical or magnetic signals or fields, or via a person to whom the access authorization information is output (for example presented visually and/or audibly) via a device, particularly a portable device, and who then provides the access authorization information to the compartment system via a user interface of the compartment system (for example by input (e.g. typing) into the user interface, or by speaking into a user interface based on voice recognition, for example), for example. The provision of the access authorization information to the compartment system by the device can be based on Bluetooth or near-field communication (NFC), for example. In line with provision of the access authorization information, said access authorization information is obtained on the compartment system, that is to say received, for example—particularly via a user interface or by means of wired or wireless transmission.

The device that provides or is used (for example by the person) to provide the access authorization information to the compartment system obtains (that is to say receives, for example) the access authorization information by communication with an apparatus that has generated the access authorization information or has obtained said access authorization information after its generation, for example. The apparatus may be part of the central system already described above, for example, and may be a server, for example. The device obtains the access authorization information by wired or wireless transmission (particularly by transmission based at least in part on cellular mobile radio (that is to say GSM, E-GSM, UMTS, LTE or 5G, for example)), for example. The transmission technique is selected, by way of example, such that the device may be remote, particularly more than 500 m, 1 km, 2 km or 5 km, from the apparatus when the access authorization information is obtained.

The provision of the access authorization information to the compartment system is a necessary condition for access to a compartment of the compartment system to be granted, particularly because, further, a positive result from a check on the access authorization information, particularly the authenticity and/or integrity thereof, on the compartment system is a necessary condition for access to the compartment of the compartment system to be granted.

The access authorization information includes particularly information that can be used on the compartment system to check whether or not access to a compartment of the compartment system can be granted when the access authorization information is provided, for example because the compartment system deems the access authorization information to be integral (intact, that is to say not manipulated since generation) and authentic (coming from a particular entity, particularly an entity rated as trustworthy by the compartment system) after a check. By way of example, at least some of the access authorization information is generated by an entity using a first key (for example a piece of information) that is known particularly only to the entity or only to the entity and the compartment system. The key may either be specific to the compartment system, that is to say may be associated with just one compartment system, but no other compartment system, or may be chosen to be the same at least for two or more compartment systems. It is also conceivable for the key to be not just specific to compartment systems but rather even to be specific (unique) to one compartment of the compartment system. In that case, each compartment of a compartment system has a different associated first key, for example, which is also not associated with another compartment of another compartment system. It is subsequently assumed by way of example that the first key is chosen to be unique for each compartment system, that is to say that each compartment system has a different associated first key.

On the basis of at least this part of the access authorization information, which part is generated using the first key, and a second key that forms a symmetric or asymmetric key pair with the first key, for example, it is then possible to check in the compartment system whether the access authorization information is integral and authentic, for example. By way of example, the access authorization information comprises one or more access authorization parameters and a piece of cryptographic information (e.g. a message authentication code (MAC)) generated using the first key and the access authorization parameters, so that after this access authorization information has been obtained it is possible for the compartment system to recompute the cryptographic information using the second key (which corresponds to the first key in this example) and to compare it with the cryptographic information obtained. In the event of a match between the two pieces of cryptographic information, it is possible to assume the integrity and authenticity of the access authorization information. By way of example, the access authorization parameters can comprise: a validity period of the access authorization information, within which the access authorization information is valid; an identifier of the compartment system for which the access authorization information is valid; an identifier of the compartment of the compartment system for which the access authorization information is valid; an identifier of the device that can provide or can be used to provide the access authorization information exclusively; and/or an identifier of a program (e.g. an app) that can provide or can be used to provide the access authorization information exclusively. The identifier of the compartment system and the identifier of the compartment of the compartment system may also be included in a single piece of information.

A further necessary condition for access to the compartment of the compartment system to be granted may then be that the check on some or all of a predefined set of the access authorization parameters against respective reference information on hand in the compartment system at least at the time of the check has been successful, for example. By way of example, it may be predefined that the identifiers of the compartment system according to the access authorization information must correspond to the locally stored identifier of the compartment system, the identifier of the compartment according to the access authorization information must correspond to a compartment on hand in the compartment system, a current time (the time also being able to comprise or be a date) on hand on the compartment system must be in the validity period according to the access authorization information, and an identifier of the device or for a program on the device according to the access authorization information must match an identifier of the device or for a program that has provided or has been used to provide the access authorization information. By way of example, the identifier of the device or of the program is taken into consideration for generating cryptographic information (e.g. an MAC), but the identifier of the device or of the program is not received in the access authorization information. By way of example the identifier of the device or of the program can then be added to the access authorization information later, for example by the device that receives the (incomplete) access authorization information and then transfers it (in completed form, that is to say with the identifier of the device or of the program) to the compartment system or outputs it to a user for provision to the compartment system. This can make certain that the (completed) access authorization information has been transferred to the compartment system, or has been transferred to the user for provision to the compartment system, by the correct device.

Granting access to the compartment can additionally require one or more further checks with a successful outcome, for example a challenge/response process with a successful outcome between the device that is used to provide the access authorization information and the compartment system. By way of example, the challenge/response process is used to authenticate the device to the compartment system. The challenge/response process can be based at least in part on information transferred to the compartment system in addition to the access authorization information, for example together with the access authorization information or as part of the access authorization information.

Further advantages of the exemplary aspects of the invention are described below on the basis of exemplary embodiments, the disclosure of which is meant to apply to all three aspects of the invention in equal measure, however.

According to an exemplary embodiment of all aspects of the invention, at generation of the access authorization information it is already certain which specific compartment from the compartments of the compartment system the compartment is, and the access authorization information is generated at least using information identifying the compartment, such that the compartment is determinable by the compartment system using the access authorization information. The method according to the second aspect of the invention can then comprise particularly determining the compartment using the access authorization information.

The information identifying the compartment then provides not just the compartment type (for example pigeonhole v. parcel compartment), for example, but rather specifically identifies the compartment. The information identifying the compartment is an identifier of the compartment or a combined identifier that denotes both the compartment system and the compartment included therein, for example. The access authorization information can further be generated using a piece of information identifying the compartment system, for example. The information identifying the compartment is particularly not a piece of information identifying and/or associated with just a person, a device or a piece of access authorization information, from which it is then possible to infer the compartment indirectly (using an association table that includes an association between compartments and people/devices/access authorization information), but rather identifies the compartment of the compartment system directly, in particular. The information identifying the compartment may be identical in each case when there are a plurality of pieces of access authorization information that relate to the same compartment of the compartment system that are associated with different people and/or devices (with which or using which the access authorization information is provided to the compartment system), for example.

By way of example, the information identifying the compartment is included in the access authorization information, for example as an access authorization parameter as already explained above. By way of example, the access authorization information includes check information that is based in part on the information identifying the compartment.

The compartment system is stateless particularly for the determination of the compartment using the access authorization information. The determination of the compartment for which access is meant to be granted is therefore, in particular, independent of information (e.g. in an association table) stored in the compartment system (and particularly changing after startup and/or during operation), with the exception of information such as the second key already explained, which is required for decrypting and/or checking the access authorization information. The determination of the compartment is, in particular, independent of information that is dependent on or reflects a current compartment occupancy of the compartment system.

Taking into consideration the information specifically identifying the compartment for generating the access authorization information forms the basis for a stateless compartment system that is more robust, particularly against data loss on account of power failures or other damage or malfunctions, than stateful compartment systems and furthermore requires less complex hardware and software, firstly for protecting association tables against loss and secondly for evaluating such association tables.

According to an exemplary embodiment of the first aspect of the invention, the compartment is selected before the access authorization information is generated, and the access authorization information is generated at least using information identifying the selected compartment, wherein the compartment is selected by a person who wants to gain access to the compartment, by a device of the person, by the compartment system or by a central system that is at least involved in managing a plurality of compartment systems, comprising the compartment system, and/or in generating the access authorization information. According to an exemplary embodiment of the second aspect of the invention, the method according to the second aspect of the invention can further comprise: selecting the compartment and outputting the information identifying the selected compartment, so that said information can be used for generating the access authorization information; or enabling selection of the compartment by a person or a device of a person. According to an exemplary embodiment of the third aspect of the invention, the method according to the third aspect of the invention further comprises: selecting the compartment and outputting the information identifying the selected compartment, so that said information can be used for generating the access authorization information; or enabling selection of the compartment by a person, and outputting the information identifying the selected compartment, so that said information can be used for generating the access authorization information.

By way of example, the selection is thus made by a person, for example via a user interface of the compartment system or a user interface of the device of the person. By way of example, the compartment system may be configured to determine its current compartment occupancy state (which represents which compartments are occupied or which compartments are unoccupied, for example) (for example by sensors on hand in the compartments (for example weight sensors, ultrasonic sensors or optical sensors) that are able to detect the occupancy of a respective compartment). The current compartment occupancy state, or just the unoccupied compartments, can then be displayed to a person on the user interface of the compartment system, and the person can be enabled to make a selection. By way of example, the information identifying the compartment is then transferred (e.g. after input into the device by the person) by means of the device of the person to an apparatus (e.g. of the central system) that generates the access authorization information, or transferred to an apparatus that transfers this information to the apparatus that generates the access authorization information. Alternatively, information pertaining the compartment occupancy state can be transferred from the compartment system to the device and the person can then be enabled to select the compartment on the device. In this scenario too, the information identifying the compartment is then transferred, by way of example, by means of the device of the person to an apparatus (e.g. of the central system) that generates the access authorization information, or transferred to an apparatus that transfers this information to the apparatus that generates the access authorization information.

Alternatively, the compartment can be selected by the compartment system and the information identifying the compartment can then be transferred from the compartment system to a device of a person, for example, so as then to be transferred by means of the device of the person to an apparatus (e.g. of a central system) that generates the access authorization information, or to be transferred to an apparatus that transfers this information to the apparatus that generates the access authorization information.

As an additional alternative, the compartment can be selected by a device of a person, for example based on information—as described above—obtained on the device from the compartment system pertaining to the current compartment occupancy state.

Finally, the compartment can also be selected by the central system, for example based on the current compartment occupancy state of the compartment system. The current compartment occupancy state is either kept track of by the central system itself, particularly based on information from respective devices of one or more people that use the compartment system (for example information indicating that a compartment has been occupied and information indicating that an occupied compartment has now become free again), or based on information pertaining to the current compartment occupancy status that has been collected by the compartment system and is transferred to the central system via a device of a person. Advantageously, in addition to the compartment occupancy state, the reservation of one or more compartments of the compartment system can also be taken into consideration for the selection of the compartment by the central system, for example the compartment is then selected taking into consideration the current compartment occupancy state and compartment reservation state. By way of example, a compartment may have been reserved when access authorization information requested for this compartment has been generated or the generation of said access authorization information has been initiated, but still no confirmation has been obtained on the central system indicating that the compartment (particularly after use of the requested access authorization information) has been occupied (for example because a shipment or delivery has been placed into the compartment and the compartment has then been sealed again). Taking into consideration the compartment reservation state for the selection of the compartment is advantageous particularly when multiple people have to gain access to compartments of the compartment system at the same time and request access authorization information for a compartment (to be selected by the central system)

approximately at the same time. If just the actual occupancy state of the compartments were taken into consideration, then a compartment could be selected repeatedly, particularly if a second request for access authorization information is obtained after, in response to a first request, access authorization information for a compartment has been generated but the compartment has not yet been reported as occupied after the use of the access authorization information and is then still available as a selection candidate for the second request.

The compartment can be selected taking account of information pertaining to the size and/or the weight of a shipment or delivery that is intended to be placed into the compartment, for example. This information can be determined (e.g. estimated or read off from the shipment or delivery) by a person, for example, and provided to the entity that makes the selection of the compartment (for example by input into the entity that makes the selection or by input into a device that transfers the information to an entity that makes the selection). Alternatively, the information can be captured by a device of a person from a shipment or delivery (e.g. scanned or transmitted by means of electrical, magnetic or electromagnetic signals or fields) and then either taken into consideration by the device itself for the selection or provided to an entity that makes the selection by the device (by indirect or direct transmission to this entity). By way of example, if unoccupied compartments of different sizes are on hand, the smallest of the compartments into which the shipment or the delivery fits is selected so as not to unnecessarily block storage space. Additionally or alternatively, the weight of the shipment or delivery can be taken into consideration for the selection of the compartment, and the compartment closest to the ground can be selected for shipments or deliveries having a weight above a predefined threshold value, for example, when multiple unoccupied compartments are on hand.

The selecting of the compartment by the central system or the obtaining of information identifying the compartment (particularly from a device of a person) may be a method step of the method according to the first aspect of the invention, for example.

According to an exemplary embodiment of the first aspect of the invention, the access authorization information is generated after an identifier of the compartment system has been captured or obtained by a device of a person who wants to gain access to the compartment of the compartment system, wherein the method according to the first aspect of the invention further comprises obtaining (for example receiving) the identifier captured or obtained by the device, and said identifier is taken into consideration for generating the access authorization information. According to an exemplary embodiment of the second aspect of the invention, the method according to the second aspect of the invention further comprises providing or outputting (e.g. by means of wireless transmission) an identifier of the compartment system for the purpose of being captured or obtained by a device of a person. According to an exemplary embodiment of the third aspect of the invention, the method according to the third aspect of the invention further comprises: capturing or obtaining an identifier of the compartment system; and outputting (e.g. by wired or wireless transmission) the captured or obtained identifier of the compartment system (for example to the central system), so that said identifier can be taken into consideration for generating the access authorization information.

By way of example, access may be necessary for putting or collecting a shipment or delivery into or from the compartment. The identifier can be captured/obtained from the compartment system optically (e.g. by scanning a piece of information mounted on the compartment system, particularly a 2D or 3D barcode) or by means of wireless transmission, for example, which is based on electrical, magnetic or electromagnetic signals or fields, that is to say via Bluetooth or NFC, for example. The identifier of the compartment system can be obtained using unidirectional communication (e.g. by a beacon transferring the identifier) or bidirectional communication (for example in reaction to a request for the identifier that is sent to the compartment system by a device), for example. The identifier of the compartment system is captured/obtained at the location of the compartment system or on the route of a person (e.g. a delivery agent or user of the compartment system) to the compartment system, for example, that is to say within 500 m, 100 m, 50 m or 10 m of the compartment system, for example.

The identifier is taken into consideration for generating the access authorization information by virtue of a key that is required for generating the access authorization information, and that is chosen differently for each compartment system, being selected on the basis of the identifier, for example. The identifier itself does then not have to be part of the access authorization information, for example. Alternatively, the identifier may be embedded in the access authorization information.

By way of example, the access authorization information is generated or generation thereof is triggered in reaction to an enquiry from a device of a person (who wishes to gain access to a compartment of the compartment system, in particular), the enquiry then including at least the identifier of the compartment system. The enquiry can also include further information, for example information about a shipment or delivery to be deposited in the compartment (e.g. about the size thereof and/or the weight thereof, and/or the priority thereof) if the selection of the compartment is performed by the central system, this information then being able to be taken into consideration for the selection of the compartment, and/or about the selected compartment (e.g. if the selection of the compartment is performed locally, that is to say by the compartment system, a person (e.g. a delivery agent or carrier of a shipment or delivery or a sender of a shipment who has deposited the shipment in a compartment for collection) or a device of the person).

According to an exemplary embodiment of the first aspect of the invention, a further necessary condition for access to the compartment of the compartment system to be granted by the compartment system is that a time of provision of the access authorization information to the compartment system and/or a time of evaluation of the access authorization information provided to the compartment system by the compartment system is/are within a limited validity period, and the access authorization information is generated such that the limited validity period is associated with the access authorization information. According to an exemplary embodiment of the second aspect of the invention, the access authorization information has been generated such that a limited validity period is associated with the access authorization information, and the method according to the second aspect of the invention further comprises checking whether a time of the provision of the access authorization information to the compartment system and/or a time of the evaluation of the access authorization information provided to the compartment system by the compartment system is/are within the limited validity period, wherein a further necessary condition for access to the compartment of the compartment system to be granted by the compartment system is that the checking yields a positive result.

By way of example, the validity period is associated with the access authorization information by being taken into consideration for the generation thereof and/or being included in the access authorization information. The validity period may be e.g. less than 1 day, particularly less than 1 h, 10 min or 5 min. The validity period may be chosen differently for different types of people who require access to a compartment of the compartment system, for example may be chosen to be shorter for delivery agents for shipments or carriers of deliveries than for the recipients of the shipments or deliveries. The validity period can begin e.g. at the time at which the access authorization information is created. The length of the validity period can be determined taking into consideration the period of time usually (that is to say on average) required for transferring the access authorization information from a generating or outputting unit to a device of a person who requires access to a compartment of the compartment system and for transferring the access authorization information from this device to the compartment system (for example by anticipating a temporal safety buffer), for example.

The limited validity period particularly in the case of severe limitation to approximately 5 min, can counter misuse with stolen devices on which access authorization information is stored and misuse with intercepted access authorization information. A piece of access authorization information thus enables access to a specific compartment of the compartment system only for a short period. After the period has elapsed, a new piece of access authorization information needs to be generated. The request for the new access authorization information (e.g. by a delivery agent or carrier) may advantageously be tied to prerequisites that are difficult for unauthorized third parties to satisfy, however, for example the device that is used to request the new access authorization information (for example from a central system) must have authentication performed for it, and/or the generation of the new access authorization information for a compartment can be triggered only by a confirmation from a device of a delivery agent or carrier indicating that a shipment or delivery has been put into this compartment. To prevent misuse with intercepted access authorization information, the access authorization information may additionally be tied to a device or a program of the device (for example by an identifier (e.g. an MAC address or telephone number) of the device that is taken into consideration for generating the access authorization information), and a further necessary prerequisite for access to the compartment to be granted may be that the identifier taken into consideration for generating the access authorization information matches the identifier of the device (or of the program) that is used to provide the access authorization information or to output it to a person.

According to an exemplary embodiment of the first aspect of the invention, the access authorization information and the compartment system are configured in a way such that the compartment system does not need to receive any further information from external units other than the access authorization information in order to perform a check to determine whether access to the compartment of the compartment system can be granted on the basis of the access authorization information and/or that the compartment system, for performing this check, only obtains information from that device from which the compartment system obtains the access authorization information. According to an exemplary embodiment of the second aspect of the invention, the method according to the second aspect of the invention further comprises checking whether access to the compartment of the compartment system can be granted on the basis of the access authorization information, wherein the access authorization information and the compartment system are configured in a way such that the compartment system does not need to receive any further information from external units other than the access authorization information in order to perform this checking and/or that the compartment system, for performing this checking, only receives information from that device from which the compartment system receives the access authorization information.

In particular, the compartment system may already have been provided, at the latest on delivery or setup at its site, with all of the information in order to be able to decide whether access to the compartment of the compartment system can be granted on the basis of the access authorization information. This information can comprise particularly the second key already explained above, which forms a symmetric or asymmetric key pair with the first key used for generating the access authorization information. The second key is different, in particular, for each compartment system of a plurality of compartment systems (for example for all the compartment systems that are managed by the central system). By way of example, this information can also comprise an identifier of the compartment system and/or an, in particular invariable, rule that stipulates which compartment identifier (that is included e.g. in the access authorization information or is taken into consideration for generating the latter) identifies which physical compartment.

According to an exemplary embodiment of all aspects of the invention, the compartment system supports neither LAN connections, WLAN connections nor cellular mobile radio connections. The compartment system is thus particularly "offline", that is to say does not have a connection to the internet and/or to the central system. By way of example, the compartment system can then communicate only with portable devices of people who desire access to compartments of the compartment system, for example via NFC or Bluetooth.

According to an exemplary embodiment of all aspects of the invention, the compartment system does not conduct any communication with a central system that is at least involved in managing a plurality of compartment systems, comprising the compartment system, and/or in generating the access authorization information. In particular, the access authorization information is not one-time passwords (OTPs) based on random information that are transferred to the compartment system on different communication channels (one of the communication channels being based on the device of the person who desires access to the compartment of the compartment system) and compared at said compartment system in order to establish whether access to a compartment can be granted.

According to an exemplary embodiment of the first aspect of the invention, the generation of the access authorization information is performed or triggered in reaction to an enquiry from a device of a person who needs access to a (particularly the) compartment of the compartment system (and is situated particularly at the location of the compartment system or on the way to the compartment system), the method according to the first aspect of the invention further comprising: transferring (e.g. by transmitting) or causing the transferring of the access authorization information after its generation in particular automatically to the device, so that provision of the access authorization information by the device or the person to the compartment system is made possible. According to an exemplary embodiment of the third aspect of the invention, the method according to the third aspect of the invention further comprises: outputting (e.g. by transmitting) an enquiry by which the access authorization information is requested, wherein the access authorization information is obtained by virtue of the access authorization information being transferred in reaction to the enquiry; or outputting (e.g. by transmitting) an enquiry by which the generation of the access authorization information is requested, wherein the access authorization information is obtained by virtue of the access authorization information being requested after the output of the enquiry and the generation of the access authorization information by output of a request. By way of example, the output of the request is triggered by the obtaining of a notification that the access authorization information has been generated, and/or includes information that was included in such a notification.

By way of example, the person is a delivery agent who wishes to deliver or collect a shipment, or a carrier who wishes to make a delivery, or a sender who wishes to deposit a shipment in a compartment for collection.

The enquiry includes e.g. the identifier of the compartment system and/or the identification of a selected compartment and/or characteristics of the desired compartment type (size, cooling required, suitable for disabled people). The characteristics of the compartment type may be information capturable from the shipment or delivery (for example through wireless capture, e.g. through scanning) or derivable from such information, for example.

According to an exemplary embodiment of the first aspect of the invention, the generation of the access authorization information is performed or triggered in reaction to information obtained from a device of a person and indicating that a shipment or delivery has been placed into the compartment and/or that the compartment has been closed, in particular by the person, and the method according to the first aspect of the invention further comprises obtaining the information indicating that a shipment or delivery has been placed into the compartment and/or that the compartment has been closed. According to an exemplary embodiment of the second aspect of the invention, the method according to the second aspect of the invention further comprises outputting (e.g. transmitting) information indicating that a shipment or delivery has been placed into the compartment and/or that the compartment has been closed, to a device of a person. According to an exemplary embodiment of the third aspect of the invention, the method according to the third aspect of the invention further comprises outputting (e.g. transmitting) information indicating that a shipment or delivery has been placed into the compartment and/or that the compartment has been closed, in order to initiate the generation of access authorization information for this compartment.

The generation of the access authorization information in reaction to the information indicating that a shipment or delivery has been placed into the compartment and/or that the compartment has been closed is performed or triggered only if all of one or more prerequisites linked to the delivery of the shipment or delivery to a recipient are satisfied, for example. The prerequisites can be checked before generation of the access authorization information is performed or triggered, for example. One of the prerequisites may be that payment has been made for a cash on delivery shipment.

According to an exemplary embodiment of the first aspect of the invention, the method according to the first aspect of the invention further comprises automatically performing or triggering, after the generation of the access authorization information, either the transmission of the access authorization information to a device of a person or the transmission of information, particularly notification information, to a device of a person.

By way of example, the information may be information about a shipment delivered to the compartment system and/or about generation of the access authorization information that has taken place and/or provision of said access authorization information for request By way of example, the person may be a recipient for whom a shipment or delivery has been delivered or supplied to the compartment system, or a delivery agent who is meant to collect a shipment that has been deposited in the compartment system by a sender.

If only the information (e.g. notification information) is transmitted to the device of the person, then the transmission of the access authorization information to the device of the person can be performed or triggered in reaction to an enquiry after access authorization information originating from the device of the person.

According to an exemplary embodiment of the first aspect of the invention, the method according to the first aspect of the invention further comprises keeping track of the current occupancy status of all the compartments or of a (in particular predefined) subset of the compartments of the compartment system, by a unit that is external to the compartment system, particularly by a central system that is at least involved in managing a plurality of compartment systems, comprising the compartment system, and/or in generating the access authorization information, wherein a compartment previously regarded as unoccupied is regarded as occupied when access authorization information relating to this compartment is generated, and a compartment previously regarded as occupied is regarded as unoccupied again when, from a device of a person, information indicating that a shipment or delivery included in the compartment has been removed is obtained.

By way of example, the method according to the first aspect of the invention can then further comprise: selecting, particularly by the external unit, the compartment prior to the generation of the access authorization information at least taking into consideration the tracked occupancy status of all the compartments or of a (in particular predefined) subset of the compartments of the compartment system, wherein the access authorization information is generated at least using information identifying the selected compartment.

By way of example, the compartment can then further be selected by taking into consideration a reservation status of all the compartments or of the subset of the compartments of the compartment system.

In this case, the compartment can be regarded as reserved when access authorization information requested for this compartment has been generated or generation thereof has been initiated, but still no confirmation has been obtained that the compartment has, particularly after use of the requested access authorization information, been occupied, for example.

Further properties and advantages of taking into consideration the compartment occupancy state and reservation state for the selection of the compartment have already been explained above.

The exemplary embodiments and exemplary refinements described above for all aspects of the present invention are also intended to be understood as being disclosed in all combinations with one another.

Further advantageous exemplary refinements of the invention can be found in the detailed description that follows for a few exemplary embodiments of the present invention, particularly in conjunction with the figures. The figures accompanying the application are intended to be used only for the purpose of clarification, however, rather than for determining the scope of protection of the invention. The accompanying drawings are not necessarily to scale and are intended merely to reflect the general concept of the present invention by way of example. In particular, features included in the figures are in no way intended to be regarded as a necessary part of the present invention.

BRIEF DESCRIPTION OF THE SEVERAL VIEWS OF THE DRAWING

In the drawings:

FIGS. 9a and 9b show a flowchart for an exemplary embodiment of a method for depositing a shipment or a delivery in a compartment of a compartment system according to an exemplary embodiment of the invention; and FIG. 10 shows a flowchart for an exemplary embodiment of a method for removing a shipment or delivery deposited in the compartment of the compartment system according to the method of FIGS. 9a and 9b from the compartment.

DETAILED DESCRIPTION OF A FEW EXEMPLARY EMBODIMENTS OF THE INVENTION

Exemplary embodiments of the present invention relate to compartment systems, for example parcel compartment systems or combined pigeonhole and parcel compartment systems, for example for use in or in front of multiple-family houses or office buildings, but alternatively also at central or logistically easily reachable places. By way of example, a user of the compartment system (for example an occupant of a multiple-family house) can be assigned a compartment for the delivery of shipments and/or for the collection of shipments (returns), in particular dynamically for each shipment. The compartment system can additionally or alternatively be used to receive shipments from delivery services (e.g. shopping, prepared meals (e.g. pizza or sushi). Other uses of the compartment system are also conceivable, for example for providing shopping ordered by users by telephone or online, the compartment system then being set up in or in front of a supermarket at which the shopping is ordered, for example.

Figure 1:
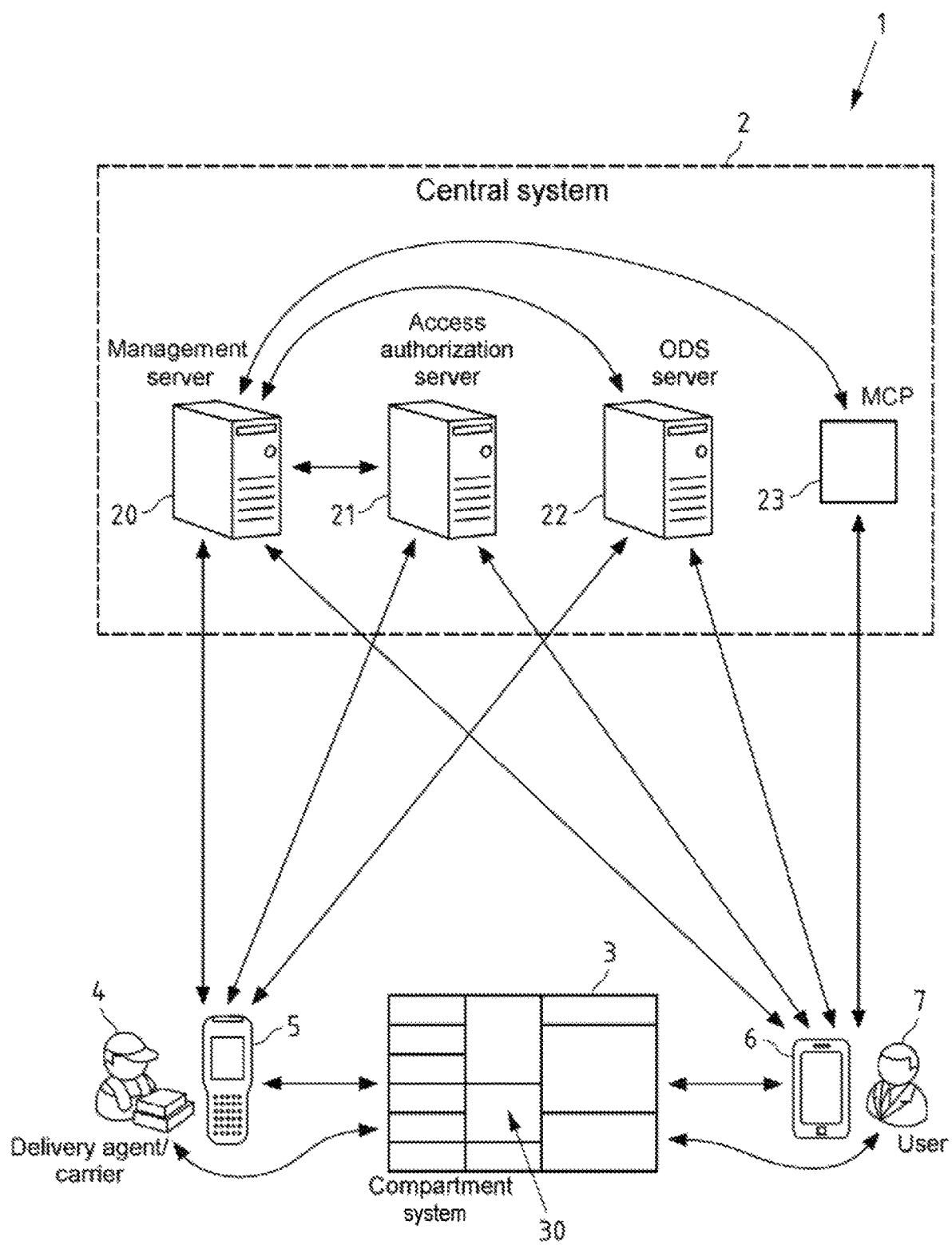
FIG. 1 shows a schematic depiction of an exemplary embodiment of a system, according to the present invention.

FIG. 1 schematically shows a system 1 according to an exemplary embodiment of the present invention. By way of example, the system is used for the delivery/collection of shipments, particularly parcels or packages, but can also be used by delivery services or used in another way, as explained above, in order to hand over things that have been ordered to a user, particularly even in his absence. The system 1 first of all comprises a compartment system 3 having a plurality of compartments, one compartment of which has been provided with the reference symbol 30. The delivery agent/carrier 4 can deposit a shipment/delivery intended for the user 7 in the compartment. Similarly, the user 7 can deposit a shipment for the delivery agent 4 in a compartment 30 of the compartment system 3 for collection, for example. Access to the compartments 30 of the compartment system 3 is controlled by the compartment system on the basis of access authorization information provided to the compartment system 3. This is provided by the device 5 (e.g. a handheld scanner) of the delivery agent/carrier 4 (e.g. by means of wireless transmission, for example optically or using electrical, magnetic or electromagnetic signals or fields, particularly by means of Bluetooth or NFC transmission) or, using said device, by the delivery agent/carrier 4 himself (for example by virtue of the access authorization information displayed on the device being input by the delivery agent/carrier 4 into a user interface (e.g. a keypad or a touch sensitive screen) of the compartment system 3) or by the device 6 (e.g. a smartphone) of the user 7 (as already explained for the device 5) or, using said device, by the user 7 himself (as already explained for the delivery agent/carrier 4).

To obtain the access authorization information, inter alia, the devices 5 and 6 communicate with the central system 2, for example at least in part via a radio link based on cellular mobile radio. This ensures the mobility of the devices 5 and 6 and also adequate radio coverage in essentially all regions where the compartment system 3 is used. By way of example, the communication is based on the internet protocol (IP), the central system being reachable via the internet and the devices 5 and 6 accessing the internet via a wireless radio link. The communication between the devices 5 and 6 and the central system 2 can be effected in partly or completely encrypted fashion. The devices 5 and 6 may each have an application (what is known as an app) installed on them that controls both the communication with the compartment system, the delivery agent/carrier 4 (in the case of the device 5) or the user 7 (in the case of the device 6) and with the central system. As a result, the user 7 can use a commercially available smartphone as device 6, for example, on which it is then merely necessary for such an app to be installed and—for example by registration in the central system 2—started up.

The central system comprises a management server 20, an access authorization server 21, an operational data store (ODS) server 22 and a multichannel platform (MCP) 23. The management server 20 is used for keeping track of the compartment occupancy state and compartment reservation state of the compartment system 3, inter alia. The access authorization server 21 is used for generating and outputting (for example on request) access authorization information. By way of example, the ODS server 22 manages shipment/delivery information and/or information pertaining to the user 7 or forms an interface to a system that provides such information. By way of example, the MCP 23 is used for sending the user 7 notifications, for example by SMS (Short Message Service) or e-mail. Some or all of the different units 20-23 of the central system 2 may also be combined in one apparatus, e.g. a server. It goes without saying that when a server is being discussed in the present case, this is also intended to be understood to mean a group of servers over which the respective tasks of the server that are to be dealt with are distributed for the purpose of faster or parallel processing, for example. The central system 2 may be associated not only with the compartment system 3 but also with a plurality of further compartment systems corresponding in functional terms to the compartment system 3, that is to say particularly can keep track of the compartment occupancy state and reservation state of said compartment systems and generate and output access authorization information for them.

Figure 2:
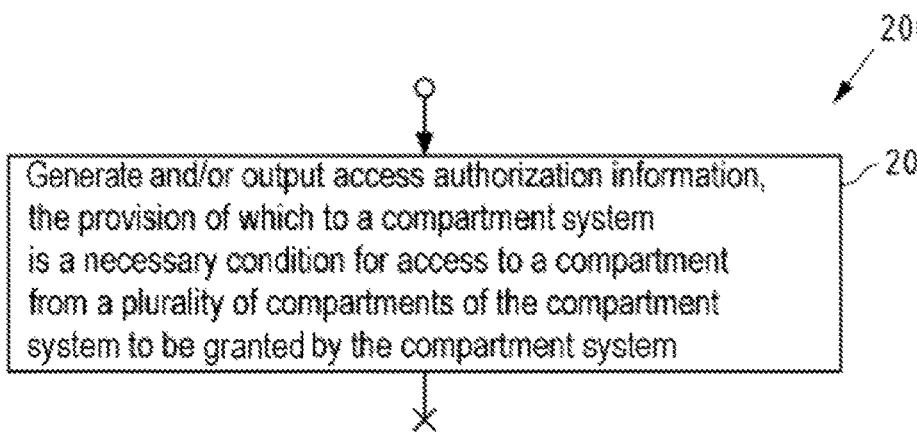
FIG. 2 shows a flowchart for an exemplary embodiment of a method according to the first aspect of the present invention.

FIG. 2 is a flowchart 200 for an exemplary embodiment of a method according to the first aspect of the present invention. The method of the flowchart 200 is performed and/or controlled by one or more units of the central system 2 (see FIG. 1), for example, particularly by the access authorization server 21 and/or the management server 20.

In a step 201 of the flowchart 200, access authorization information is generated and/or output, the provision of which to a compartment system is a necessary condition for access to a compartment from a plurality of compartments of the compartment system to be granted by the compartment system. Further details and/or steps of the first aspect of the invention have already been explained in detail above. The flowchart 200 may be augmented by one or more further steps that result from the flowcharts of FIG. 8-10.

Figure 3:
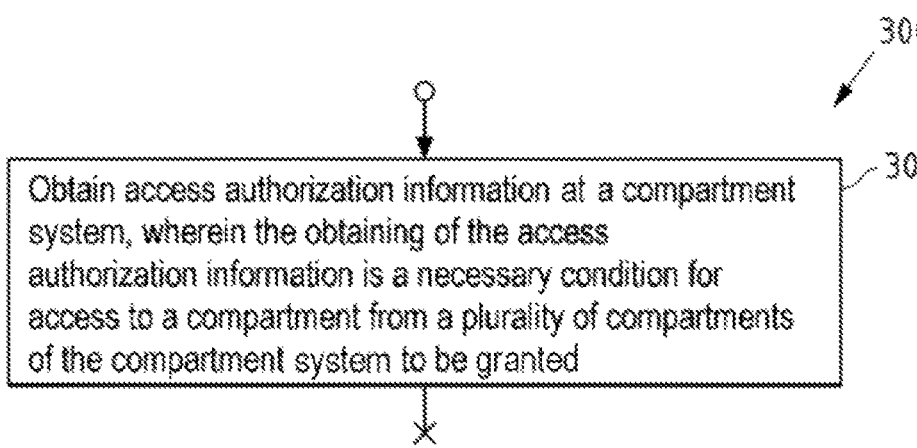
FIG. 3 shows a flowchart for an exemplary embodiment of a method according to the second aspect of the present invention.

FIG. 3 is a flowchart 300 for an exemplary embodiment of a method according to the second aspect of the present invention. The method of the flowchart 300 is performed and/or controlled by the compartment system 3 (see FIG. 1, particularly by a control unit of the compartment system 3), for example.

In a step 301, of the flowchart 300, access authorization information is obtained at a compartment system (e.g. received wirelessly or via a user interface), the obtainment of the access authorization information being a necessary condition for access to a compartment from a plurality of compartments of the compartment system to be granted. Further details and/or steps of the second aspect of the invention have already been explained in detail above. The flowchart 300 may be augmented by one or more further steps that result from the flowcharts of FIG. 8-10.

Figure 4:
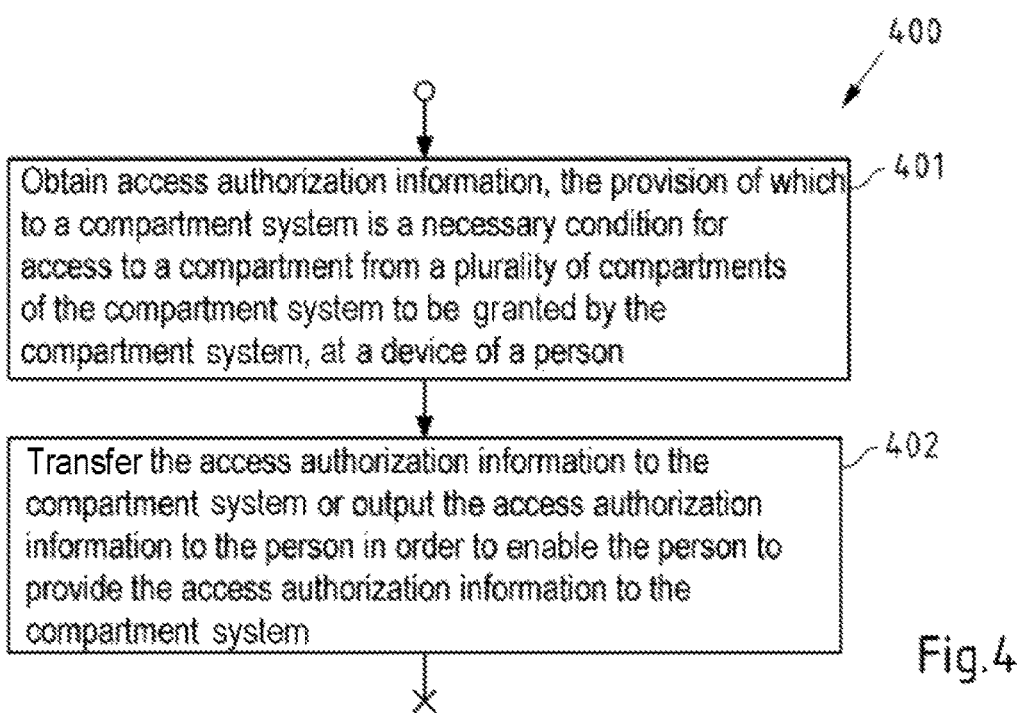
FIG. 4 shows a flowchart for an exemplary embodiment of a method according to the third aspect of the present invention.

FIG. 4 is a flowchart 400 for an exemplary embodiment of a method according to the third aspect of the present invention. The method of the flowchart 400 is performed and/or controlled by the device 5 or the device 6 (see FIG. 1), for example.

In a step 401 of the flowchart 400, access authorization information is obtained (e.g. by wireless transmission) at a device of a person (e.g. delivery agent/carrier 4 or person 7), the provision of which access authorization information to a compartment system is a necessary condition for access to a compartment from a plurality of compartments of the compartment system to be granted by the compartment system. In a step 402, the access authorization information is transferred to the compartment system (for example by wireless communication) or output to the person in order to enable the person to provide the access authorization information to the compartment system. Further details and/or steps of the third aspect of the invention have already been explained in detail above. The flowchart 400 may be augmented by one or more further steps that result from the flowcharts of FIG. 8-10.

Figure 5:
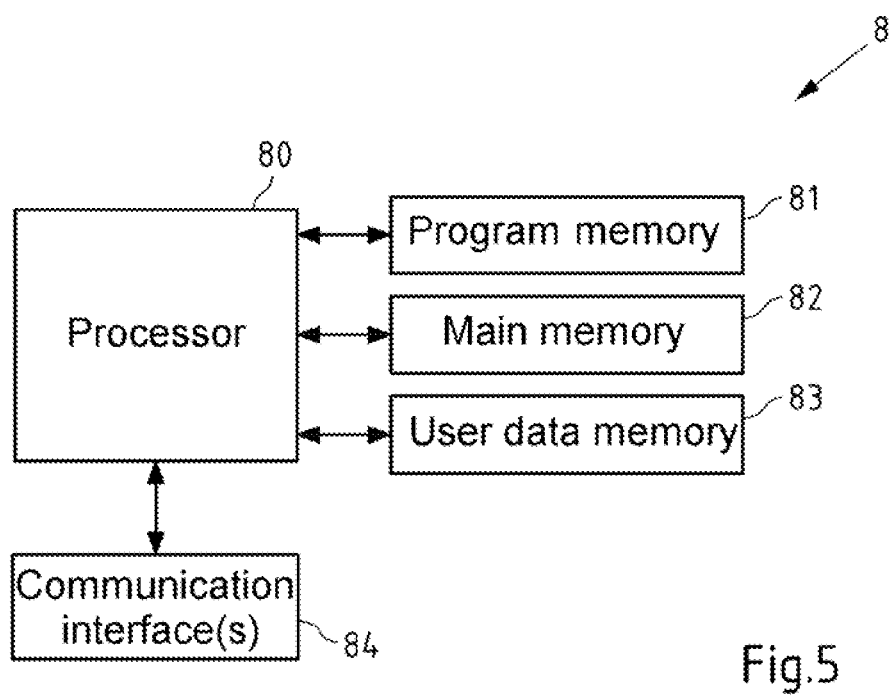
FIG. 5 shows a schematic depiction of an exemplary embodiment of an apparatus according to the first aspect of the invention.

FIG. 5 is a schematic depiction of an exemplary embodiment of an apparatus 8 according to the first aspect of the invention. By way of example, the apparatus 8 can represent the respective units of the central system 2, particularly the access authorization server 21 and the management server 20.

The apparatus 8 comprises a processor 80, a program memory 81, a main memory 82, a user data memory 83 and one or more communication interface(s) 84. By way of example, the processor executes a program according to the first aspect of the invention that is stored in the program memory 81, for example as firmware. Main memory 82 is used particularly for storing temporary data during the execution of this program.

The user data memory 83 is used for storing data that are required for the execution of the program. In the present case, these may be respective keys for one or more compartment systems 3, for example, that are respectively required for generating access authorization information for compartments of these compartment systems 3. In that case, an appropriately corresponding e.g. symmetric or asymmetric key is also stored in each of the compartment systems 3. An example of a symmetric key is an AES (Advanced Encryption Standard) key. The user data memory thus contains N different keys for N compartment systems, for example, and each of the N compartment systems contains a corresponding one of these keys, so that none of the N compartment systems stores the same key. The key stored in the compartment system 3 is used particularly for checking the integrity and authenticity of obtained access authorization information. By way of example, the access authorization information contains an identifier of the compartment of the compartment system as an access authorization parameter and possibly further access authorization parameters that denote the compartment system and/or a device or app used for transferring the access authorization information, for example, and/or define a validity period for the access authorization information. To generate the access authorization information for a compartment of a compartment system, the processor 80 performs cryptographic operations for the access authorization parameters using the key corresponding to the key of the compartment system and stored in the user data memory 83, for example, in order to obtain a piece of check information. Said check information is then provided to the devices 5 or 6 together with the access authorization parameters as access authorization information. If, as proof of the access authorization for a compartment of the compartment system 3, this access authorization information is now transmitted to the compartment system 3 or input therein, the received access authorization information and the key stored in the compartment system can be used to check whether the access authorization information is integral and authentic. By way of example, the check information is recomputed based on the received access authorization parameters and the key according to the same cryptographic operations as have been performed by the processor 80, and is compared with the received check information. In the event of a match, it is assumed that the received access authorization information is integral and authentic, for example. The cryptographic operations can comprise the formation of a message authentication code (MAC) for the access authorization parameters based on a key, for example. Examples of MACs are the message authentication algorithm (MAA), the KeyedHash Message Authentication Code (HMAC) or the cipher-based message authentication code (CMAC) specified by the NIST. In the case of asymmetric key pairs, the cryptographic information can consist of an electronic signature (that is to say e.g. an encrypted hash value for the access authorization parameters), for example.

The communication interface(s) 84 can comprise at least one interface for communication with other units of the central system 2 and/or with the devices 5 and 6. This communication can be based on the internet protocol (IP), for example. To this end, at least one of the communication interface(s) 84 is embodied as a local area network (LAN) interface, for example.

Figure 6:
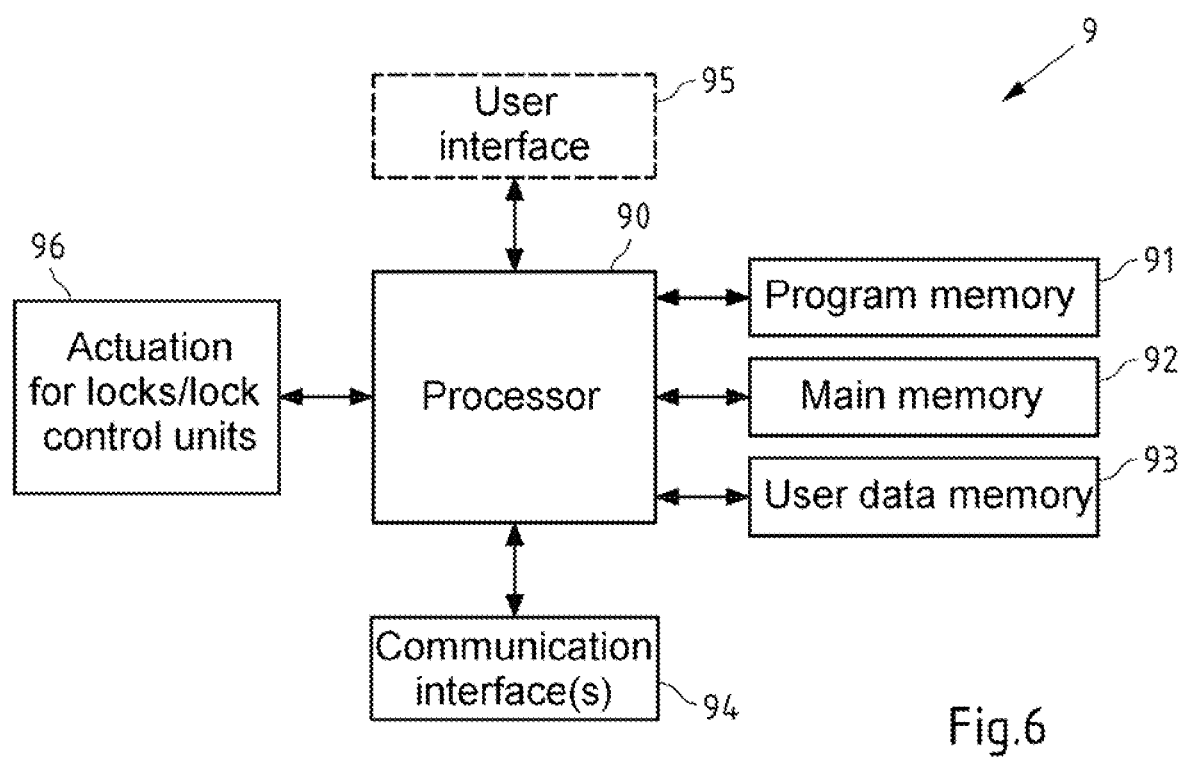
FIG. 6 shows a schematic depiction of an exemplary embodiment of an apparatus according to the second aspect of the invention.

FIG. 6 is a schematic depiction of an exemplary embodiment of an apparatus 9 according to the second aspect to the invention. The apparatus 9 can represent a compartment system 3 (see FIG. 1) or the control unit thereof, for example.

The apparatus 9 comprises a processor 90, a program memory 91, a main memory 92, a user data memory 93, one or more communication interface(s) 94, an optional user interface 95 and an actuation unit 96 for the locks or lock control units of the compartments of the compartment system. By way of example, the processor 90 executes a program according to the second aspect of the invention that is stored in the program memory 91, for example as firmware. Main memory 92 is used particularly for storing temporary data during the execution of this program.

The user data memory 93 is used for storing data that are required for the execution of the program. In the present case, this may be the key (e.g. an AES key) already explained above that is associated with the compartment system, for example. This key has been associated with the apparatus 9, for example during production itself, on delivery or on startup. Alternatively, the key may also be stored in the program memory 91 together with the program or as part thereof. In exemplary embodiments of the present invention, the apparatus 9 is stateless with respect to the determination, using the access authorization information, of the compartment that possibly needs to be opened. The determination of the compartment for which access is meant to be granted is therefore in particular independent of information (e.g. an association table) stored in the apparatus 9 (and particularly changing after startup and/or during operation), with the exception of information such as the key, for example. The determination of the compartment is in particular independent of information that is dependent on or reflects a current compartment occupancy of the compartment system.

By way of example, the communication interface(s) 94 comprise(s) an interface for wireless communication with the devices 5 and 6, for example by means of optical transmission and/or by means of communication that is based on electrical, magnetic or electromagnetic signals or fields, particularly on Bluetooth, NFC and/or RFID (Radio Frequency Identification). In this case, the same or a different transmission method can be used for the communication with the device 5 as for the communication with the device 6. The apparatus 9 (and therefore the compartment system 3) is not configured for direct communication with the central system 2, for example, that is to say does not have a communication interface that enables access to the internet or to another network to which the central system 2 is connected, for example.

The user interface 95 is optional and configured for communication with the delivery agent/carrier 4 and/or the user 7. This can comprise an output unit for displaying (e.g. via a screen or via compartment-specific luminous displays (e.g. for depicting a respective occupied/unoccupied state) or audibly outputting information and/or a unit for obtaining (access authorization) information (e.g. a keypad or a touch sensitive screen with on-screen keyboard or a voice recognition module) from the people 4 and/or 5, for example.

The actuation unit 96 enables a single compartment of the compartment system to be specifically opened or unlocked in order to enable opening, particularly by actuating the lock of the compartment or a lock control unit of the compartment Additionally or alternatively, locking of the compartment can be caused. The actuation unit 96 is connected to all the locks or lock control units of the compartment system by means of respective wiring, for example, or connected to a bus to which all the locks or lock control units of the compartment system are also linked.

Figure 7:
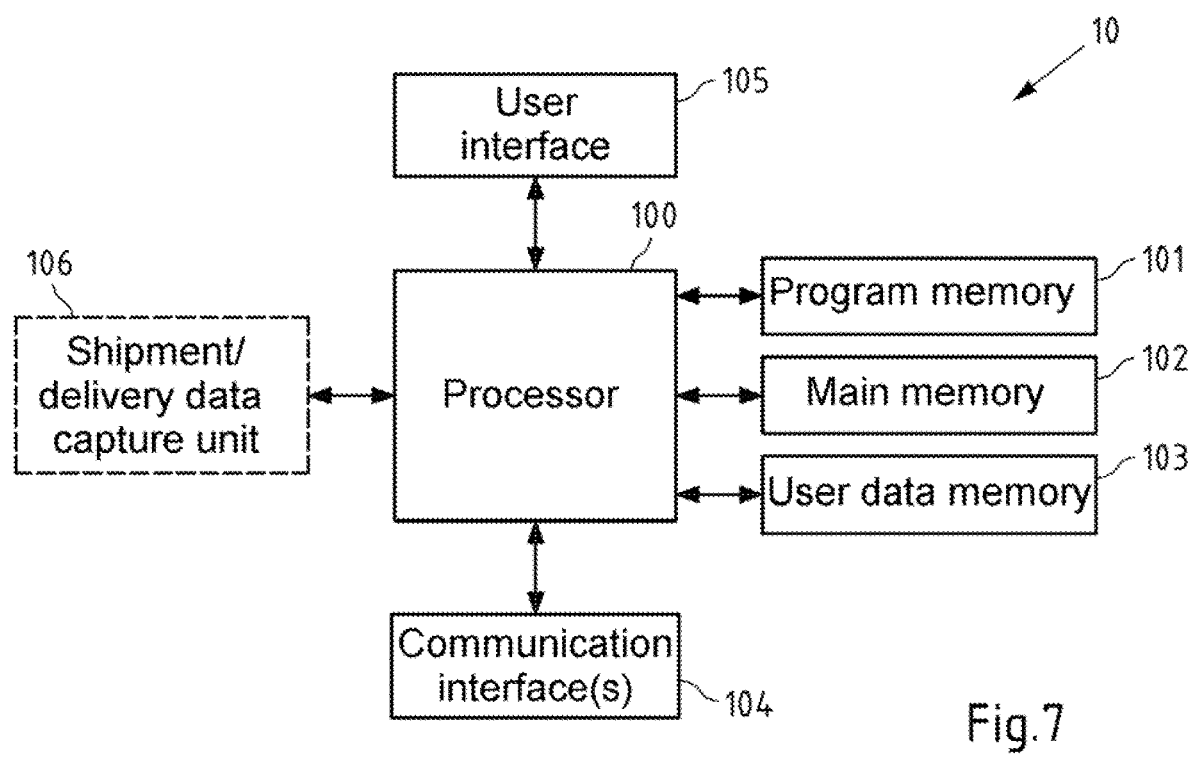
FIG. 7 shows a schematic depiction of an exemplary embodiment of an apparatus according to the third aspect of the invention.

FIG. 7 is a schematic depiction of an exemplary embodiment of an apparatus 10 according to the third aspect of the invention. The apparatus 10 can represent the device 5 and 6, for example. In the case of the device 5, the apparatus 10 may be a portable scanning device of a delivery agent/carrier 4 (what is known as a handheld scanner), for example, that is to say a device that is configured for optically capturing shipment or delivery data, particularly in the form of 2D or 3D barcodes, from the shipment or delivery. If the apparatus 10 represents the device 6 of the user 7, it may be particularly a smartphone, that is to say particularly a mobile phone with the capability of independently executing more complex programs, what are known as apps, too.

The apparatus 10 comprises a processor 100, a program memory 101, a main memory 102, a user data memory 103, one or more communication interface(s) 104, a user interface 105 and an optional unit 106 for capturing shipment or delivery data.

By way of example, the processor 100 executes a program according to the third aspect of the invention that is stored in the program memory 101, for example as an app or as firmware. Main memory 102 is used particularly for storing temporary data during the execution of this program.

The user data memory 103 is used for storing data that are required for the execution of the program.

The communication interface(s) 104 comprise(s) one or more interfaces for the communication of the apparatus with the central system. By way of example, the interface may be based on IP, but, on account of the portability of the apparatus 10, can make use of a wireless transmission technique as a physical layer that is based on cellular mobile radio (e.g. GSM, E-GSM, UMTS, LTE, 5G) or a WLAN (Wireless Local Area Network), for example. The communication interface(s) 104 optionally further comprises(s) an interface for communication with the compartment system 3, based on optical transmission, Bluetooth or NFC, for example. In this case, a transmission technique with a relatively short range, for example less than 100 m or 10 m or 5 m, may be adequate and possibly even desirable in order to make it difficult for third parties to monitor the transmission.

The user interface 105 may be embodied as a screen and keypad or as a touch sensitive display (touchscreen), possibly with additional audible and/or haptic signal generation units. The display of access authorization information via the user interface can make a separate interface from the interfaces 104 for communication with the compartment system 3 unnecessary if this access authorization information can be input into a user interface of the compartment system 3 (see user interface 95 of FIG. 6). The capture unit 106 for capturing shipment or delivery data (for example in the form of an optical scanning unit) is on hand only in the case of the device 5 but not in the case of the device 6, for example.

In the exemplary embodiments of FIG. 5-7, the processor may respectively be a control unit, a microprocessor, a microcontrol unit such as a microcontroller, a digital signal processor (DSP), an application-specific integrated circuit (ASIC) or a field programmable gate array (FPGA), for example. In the exemplary embodiments of FIGS. 5-7, the program memory and/or the user data memory may be persistent memory, for example, such as a read only memory (ROM), for example. The program memory may be permanently connected to the respective processor, for example, but may alternatively also be detachably connected to the respective processor, for example as a memory card, floppy disk or optical data storage medium (e.g. CD or DVD). The main memory of the exemplary embodiments of FIG. 5-7 is used for storing temporary results during the execution of the program instructions, for example, and in this case is a volatile memory, such as a random access memory (RAM), for example.

Figure 8:
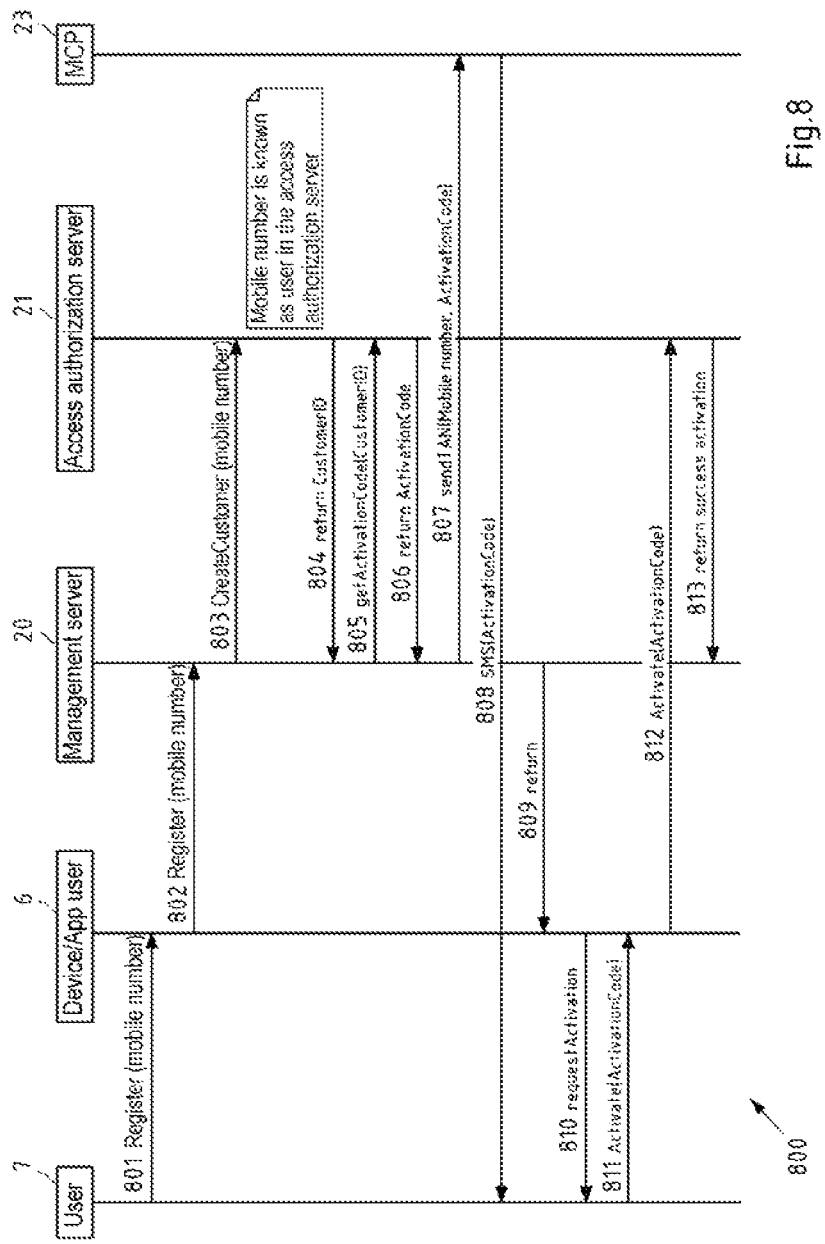
FIG. 8 shows a flowchart for an exemplary implementation of a method for registering a customer of a compartment system on the access authorization server according to an exemplary embodiment of the invention.

FIG. 8 shows a flowchart 800 for an exemplary implementation of a method for registering a customer of a compartment system on the access authorization server according to an exemplary embodiment of the invention. By way of example, the method is performed after the user 7 who wishes to use the compartment system 3 has installed an appropriate app (particularly of the operator of the compartment system 3, for example a delivery company) on his device 6. Registration is used particularly to make the mobile phone number (which may be exemplary and representative of another identifier of the device 6, for example the IMEI (International Mobile Equipment Identity)) known on the access authorization server 21 and at least to make certain that the mobile radio number indicated to the access authorization server 21 is under the control of the party that initiated registration of this mobile phone number with the access authorization server 21.

In step 801, the user 7 initiates the process by inputting the mobile phone number of the device 6 into the app or enabling the app to access this mobile phone number. It should be noted that, fundamentally, the mobile phone number of another device different than the device 6 can also be specified, provided that the user 7 controls this other device (that is to say can at least receive SMS messages thereon).

In step 802, the app sends a message containing the mobile phone number to the management server, which then, in step 803, causes the access authorization server 21 to create a new customer and associate said customer with the mobile phone number. In step 804, the access authorization server 21 returns an identifier generated for the new customer (CustomerID) to the management server 20, which then, in step 805, requests an activation code from the access authorization server 21 and obtains said activation code in step 806. In step 807, the management server then uses the MCP 23 in order to have the activation code sent to the mobile phone number. In this case, additionally or alternatively, other communication paths are also conceivable, for example email or Whatsapp messages, in which case an email address of the user 7 is stored in the access authorization server 21 in addition or as an alternative to the mobile phone number.

The MCP 23 then sends the activation code to the specified mobile phone number in step 808. In step 809, the management server 20 uses a message to the app to initiate a process 810 in which the app requests the activation code from the user.

In step 811, the user 7 inputs the activation code sent to the device 6 (or another device as explained above) into the app, which then forwards said activation code to the access authorization server 21 in step 812. The access authorization server can then compare the activation code output in step 806 with the activation code received in step 812 and, in the event of a match, draw the conclusion that the mobile phone number specified on registration is controlled by that person who performed the registration. Advantageously, the access authorization server 21 accepts the activation code obtained in step 812 only within a limited time interval, for example within a few minutes (e.g. 5 minutes) after the output in step 806, in order to reduce opportunities for misuse. The access authorization server 21 can then, in step 813, also inform the management server 20 that the customer to be created according to the step 803 has been activated successfully. As part of the activation code or in addition thereto, the access authorization server 21 can also output a key or information pertaining to the generation of a key in step 806 and then, as described in steps 807, 808 said key or information can be transferred to the user 7 and finally, in step 811, to the app. By way of example, the key can then be stored in the app or the information pertaining to the generation of a key can be used in the app. The key transferred or generated can then correspond to a key in the access authorization server 21 (for example as a symmetric or asymmetric key pair), so that the future communication between the access authorization server 21 and the app can be effected in encrypted fashion based on this key and the corresponding key. In this case, the key transmitted to the app or generated therein can be chosen to be different particularly for each app managed by the access authorization server, and it may then be associated with the respective mobile phone number in the access authorization server 21, for example.

The registration procedure described according to FIG. 8 can also be performed for the device 5 of a delivery agent 4, for example, in order to enable the communication between the access authorization server 21 and an app on the device 5 of the delivery agent 4. Instead of the mobile phone number, it is possible for an identifier of the device 5 (e.g. the devID of FIG. 9a/9b) to be registered in the access authorization server 21 in this case, for example. In this case, the output and checking of the activation code can be dispensed with, for example, particularly if it is possible to make certain in another way that the respective device identifier (e.g. the devID) is actually associated with the respective correct device 5. When the identifier of the device 5 is referred to below, this is intended to be understood to mean either the identifier of the device 5 or the identifier of the app on the device 5.

Figure 9A:
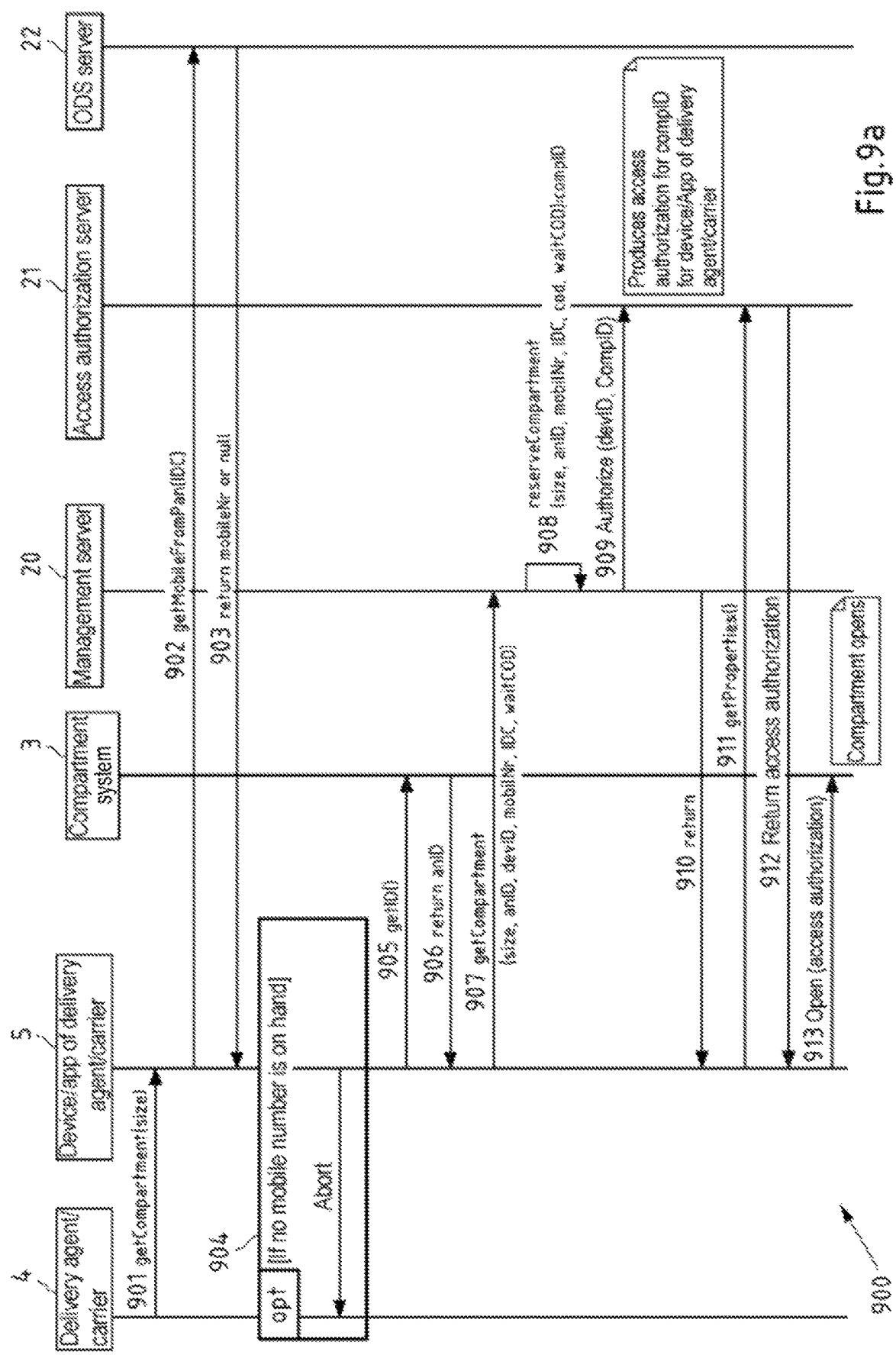

FIG. 9a/b is a flowchart 900 for an exemplary embodiment of a method for depositing a shipment or a delivery in a compartment of a compartment system according to an exemplary embodiment of the invention. In this case, step 913 of FIG. 9a is followed by step 914 of FIG. 9b. The description relates to how a delivery agent/carrier 4 requiring access to a compartment 30 of a compartment system 3 gains this access and, after the shipment/delivery has been put into the compartment 30, an access authorization for the recipient 7 of the shipment/delivery is generated and the recipient 7 is informed about the readiness of the shipment/delivery for collection.

In step 901, the delivery agent/carrier 4 notifies a program on the device 5, which program is subsequently referred to as an app, that he requires access to an (arbitrary) compartment of the compartment system. This enquiry can include one or more parameters that can be taken into consideration for the selection of the compartment. In the present exemplary embodiment, this is the compartment size, which the delivery agent/carrier 4 derives from the size of the shipment/delivery, for example. In steps 902 and 903, communication between the app and the ODS server 22 establishes whether the ODS server 22 has stored a data record containing a mobile phone number of the recipient (user 7) of the shipment/delivery for the shipment/delivery. By way of example, the identification of the data record can be based on an identifier of the shipment/delivery (IDentCode, IDC, which is used for tracking shipments, for example) that is transferred from the app to the ODS server 22 in step 902, for example, and has previously been captured from the shipment/delivery using a capture unit (e.g. a barcode scanner) of the device 5, for example.

In (optional) step 904, a check is performed to determine whether a mobile phone number of the recipient (user 7) has been able to be determined. If this is not the case, the method 900 aborts. Otherwise, the app requests an identifier (in this case referred to as "anID" by way of example) for the compartment system 3 in step 905 and obtains said identifier in step 906. This request for the identifier of the compartment system 3 can be based on Bluetooth or NFC communication, for example, but alternatively also on optical capture by means of a capture unit of the device 5, in which case step 905 is dispensed with and step 906 represents the capturing.

In step 907, the app then addresses the management server 20 with an enquiry that includes, inter alia, the identifier of the compartment system (anID), the desired compartment size (size), the identifier of the device 5 or of the app on the device 5 (devID), the mobile phone number of the recipient (mobilNr), the identifier of the shipment/delivery (IDC) and a piece of information regarding whether or not a cash on delivery shipment that has not yet been paid for is involved (waitCOD). This results in reservation of a compartment in step 908. In this case, the reservation also contains the selection of the compartment (identified from an identifier that is referred to as "CompID" by way of example in this case), for example, particularly taking into consideration the compartment size (size). By way of example, the management server 20 continually keeps track of the current compartment occupancy state and compartment reservation state of the compartment system 3, so that a compartment that is still free can be selected on the basis of the compartment occupancy state and compartment reservation state and optionally further parameters, such as e.g. the desired compartment size.

When a free compartment has been selected, the management server 20 authorizes, in step 909, the generation of an access authorization (in this case also referred to as access authorization information) by the access authorization server 21. To this end, at least the identifier of the selected compartment (CompID) and the identifier of the device 5 or the app thereof (devID) that is meant to be permitted to access the access authorization information generated are transferred to said access authorization server. Additionally, it is also possible for the identifier of the compartment system 3 to be transferred, for example in order to enable the access authorization server 21 to select the correct key (which may be specific to the respective compartment system) for generating the access authorization information. If all the compartment systems use the same key, the access authorization server 21 does not necessarily need to be informed of the compartment system for which it generates access authorization information. At least the identifier of the compartment (CompID) is received in the access authorization information as an access authorization parameter, for example, and, by this means, the first key, which is stored in or accessible to the access authorization server 21, is used to perform cryptographic operations for obtaining a piece of check information (e.g. an HMAC) that is likewise part of the access authorization information. Further access authorization parameters (which likewise influence the check information) are the identifier of the compartment system and/or the identifier of the device 5 and/or information about a time-limited validity period of the access authorization information, for example.

The access authorization information generated is then stored on the access authorization server 21, for example in association with the identifier of the device 5 or the app thereof for later associability with the device 5.

In step 910, feedback to the app is provided, in response to which the app then sends an enquiry after access authorization information to the access authorization server 21 in step 911. By way of example, this enquiry includes information about the identifier of the device 5 or the app thereof (devID). Using this information (or otherwise), the access authorization information that has been generated for the device 5 (or the app thereof) in response to the enquiry 907 therefrom can then be identified on the access authorization server 21 and, in step 912, output (e.g. transmitted, for example by means of cellular mobile radio) to the device 5.

The access authorization information obtained can then be used to open the compartment 30 of the compartment system 3. To this end, the access authorization information is transmitted to the compartment system 3, for example by wireless communication or by input into a user interface of the compartment system 3, in step 913. The compartment system 3 uses the access authorization information to determine which specific compartment 30 of the compartment system 3 is meant to be opened, checks the integrity and authencity of the access authorization information and opens (unlocks) the relevant compartment 30 in the event of a check with a positive outcome.

In step 914, the delivery agent/carrier then places the shipment/delivery into the compartment 30 and closes the compartment in step 915, particularly so that a catch of the lock of the compartment 30 latches and the compartment is therefore locked again. The delivery agent/carrier then confirms to the app that the shipment/delivery has been placed in, which results in the transmission of a piece of confirmation information (comprising the identifier of the compartment, CompID) in step 917. The management server 20 then sets the status of the compartment 30, which was previously "reserved", to "occupied". Alternatively, it would be possible to assume the occupied status as early as in step 908 and not to distinguish between reserved and actually occupied compartments.

In step 918, the mobile phone number of the recipient of the shipment/delivery (as was obtained in step 907) is called up on the management server, in the same way as the information (waitCOD) regarding whether or not there is a COD parcel that has been paid for.

Subsequently, two alternatives 919 and 920 are possible. According to alternative 919, there is a COD parcel that a recipient has not yet paid for (waitCOD=true), however. By way of example, the COD parcel must already have been paid for before the recipient (user 7) can have access to his shipment/delivery. No action is then performed until a payment confirmation is provided to the management server by the ODS server 22. This case is depicted in section 922 of the flowchart 900. In step 9220, the confirmation about the payment having been made is received on the management server 20 from the ODS server 22 and then, in step 9221, the generation of access authorization information by the access authorization server 21 is authorized. To this end, the mobile phone number of the recipient (user 7) for whom the access authorization information is intended and the identifier of the compartment 3 are transferred to the access authorization server. The access authorization server 21 then generates the access authorization information using the identifier of the compartment 3 (for example as an access authorization parameter) and associates this access authorization information with the mobile phone number, for example. The mobile phone number may additionally or alternatively also be part of the access authorization information as an access authorization parameter (for example in order to enable the compartment system to perform an additional check to determine whether the access authorization information has also actually been transferred from the device 6 for whose user 6 it has been generated to the compartment system 3, the mobile phone number of the device then likewise—independently of the access authorization information—being transferred to the compartment system 3 for cross-checking, but this not absolutely necessary. As already explained, it is also possible for the identifier of the compartment system to be included in the access authorization information as an access authorization parameter, for example.

According to the alternative 920, the shipment/delivery is either not a COD parcel or said COD parcel has already been paid for. Subsequently, in step 9200, the generation of access authorization information by the access authorization server 21 is authorized, as has already been described for step 9221.

In step 921, which may also be arranged beneath step 922, the app transfers a message (that contains at least the identifier of the compartment 30 and, by way of example, also an identifier of the shipment/delivery) to the ODS server 22 in order to cause notification of the recipient (user 7) of the shipment/delivery indicating that the shipment/delivery has been deposited in a specific compartment 30 of the compartment system 3 and access authorization information for the request has been provided on the access authorization server 21. By way of example, the recipient is determined on the basis of the identifier of the shipment/delivery from a shipment/delivery data record that is on hand on the ODS server 22. Alternatively, in step 921, the management server 20 can also cause notification of the recipient, for example by transferring an SMS or MMS to the mobile phone number that is known on the management server 20 from step 907.

A result of the flowchart 900 of FIG. 9a/9b is thus that a shipment/delivery has been deposited in a compartment 30 of the compartment system 3, access authorization information pertaining to this compartment 30 has been generated and provided for retrieval for the correct recipient (identified by the mobile phone number) on the access authorization server 21, and the recipient has been informed about these circumstances.

FIG. 10 is a flowchart 1000 for an exemplary embodiment of a method for removing a shipment or delivery deposited in the compartment 30 of the compartment system 3 according to the method of FIG. 9a/9b from the compartment 30.

In a step 1001, the user 7 tells a program on his device 6 (which program is subsequently referred to as an app) that a compartment of the compartment system 30 is meant to be opened, for example by starting the app and/or operating a button in the app. The app then requests from the access authorization server 21 the access authorizations (that is to say access authorization information) stored therein for the app or the device 6. Said access authorizations are associated with the mobile phone number of the device 6 or with an identifier of the device or of the app, for example, in the access authorization server 21, so that this information can be used to determine the relevant access authorizations on the access authorization server 21. To this end, the mobile phone number or a similar identifier is transferred to the access authorization server 21 in step 1002.

In step 1003, one or more pieces of access authorization information is/are transmitted to the app. As already mentioned, the communication in steps 1002 and 1003 can be effected in encrypted fashion.

If one or more pieces of access authorization information have been received by the app, an identifier of the compartment system is requested by the app or the device 6 in step 1004, for example by wireless communication (e.g. Bluetooth or NFC). Otherwise, the flowchart 1000 aborts, for example. As already explained above for steps 905/906, this can alternatively also be effected by optically scanning an identifier of the compartment system using the device 6, e.g. using a camera of the device 6.

In step 1005, that/those piece(s) of access authorization information from the access authorization information obtained that is/are intended for the compartment system with the identifier anID is/are selected, for example on the basis of the identifier of the compartment system anID that is included in the access authorization information as an access authorization parameter.

For each piece of this selected access authorization information, the process 1006 described below is then performed with steps 10060-10067.

In step 10060, the app sends a message to the compartment system 3, wherein the message comprises the access authorization information. Based on the access authorization information, the compartment system checks the compartment to be opened, checks the access authorization information and unlocks (or opens) the compartment in the case of a positive check (for example comprising the positive check on the authenticity and/or integrity of the access authorization information and the positive check on the access authorization parameters included in the access authorization information, for example whether the identifier of the compartment system fits the compartment system, whether the identifier of the compartment in the compartment system is on hand and/or whether a validity period for the access authorization information has not yet expired).

In step 10061, the user 6 removes the shipment/delivery and closes the door of the opened compartment in step 10062. In step 10063, the user 7 confirms to the app that he has obtained the shipment/delivery.

In response to this confirmation, the app sends a message (containing the identifier of the compartment) to the management server 20 in step 10064 in order to cause the compartment to be released. On the management server 20, the state of a compartment is then changed from occupied to free, that is to say that the compartment occupancy state of the compartment system is updated.

In step 10066, a confirmation is sent from the management server 20 to the app that comprises an identifier of the shipment/delivery (IDC), for example.

In step 10067, the app informs the ODS server 22 that the shipment/delivery (having the identifier IDC) has been received by the user 7.

The mechanisms explained in FIGS. 9a/b and 10 for a "last-mile scenario", in which a shipment/delivery is deposited in a compartment 30 of the compartment system 3 by a delivery agent/carrier 4 and then removed by the recipient (user 7), can readily be transmitted to a "first-mile scenario", in which a shipment/delivery is deposited in a compartment 30 of the compartment system 3 by the user 7 and collected from the compartment by a delivery agent/carrier 4. The claims below therefore cover both last-mile and first-mile fields of application.

Exemplary Embodiments

In Embodiment 1, a method is provided a step of generating and/or outputting access authorization information, the provision of which to a compartment system is a necessary condition for access to a compartment from a plurality of compartments of the compartment system to be granted by the compartment system.

In Embodiment 2, provided is a method according to Embodiment 1, wherein at generation of the access authorization information it is already certain which specific compartment from the compartments of the compartment system the compartment is, and wherein the access authorization information is generated at least using information identifying the compartment, such that the compartment is determinable by the compartment system using the access authorization information.

In Embodiment 3, provided is a method according to Embodiment 2, wherein the compartment system is stateless with respect to the determination of the compartment using the access authorization information.

In Embodiment 4, provided is a method according to one of the preceding Embodiments, wherein the compartment is selected before the access authorization information is generated, and the access authorization information is generated at least using information identifying the selected compartment, and wherein the compartment is selected by a person who wants to gain access to the compartment, by a device of the person, by the compartment system or by a central system that is at least involved in managing a plurality of compartment systems, comprising the compartment system, and/or in generating the access authorization information.

In Embodiment 5, provided is a method according to one of the preceding Embodiments, wherein the access authorization information is generated after an identifier of the compartment system has been captured or obtained by a device of a person who wants to gain access to the compartment of the compartment system, wherein the method further comprises obtaining the identifier captured or obtained by the device, and said identifier is taken into consideration for generating the access authorization information.

In Embodiment 6, provided is a method according to one of the preceding Embodiments, wherein a further necessary condition for access to the compartment of the compartment system to be granted by the compartment system is that a time of provision of the access authorization information to the compartment system and/or a time of evaluation of the access authorization information provided to the compartment system by the compartment system is/are within a limited validity period, and wherein the access authorization information is generated such that the limited validity period is associated with the access authorization information.

In Embodiment 7, provided is a method according to one of the preceding Embodiments, wherein the access authorization information and the compartment system are configured in a way that the compartment system does not need to receive any further information from external units other than the access authorization information in order to perform a check to determine whether access to the compartment of the compartment system can be granted on the basis of the access authorization information and/or that the compartment system, for performing this check, only obtains information from that device from which the compartment system obtains the access authorization information.

In Embodiment 8, provided is a method according to one of the preceding Embodiments, wherein the generation of the access authorization information is performed or triggered in reaction to an enquriy from a device of a person who needs access to a compartment of the compartment system, the method further comprising: transferring or causing the transferring of the access authorization information after its generation in particular automatically to the device, so that provision of the access authorization information by the device or the person to the compartment system is made possible.

In Embodiment 9, provided is a method according to one of the preceding Embodiments, wherein the generation of the access authorization information is performed or triggered in reaction to information obtained from a device of a person and indicating that a shipment or delivery has been placed into the compartment and/or that the compartment has been closed, in particular by the person, the method further comprising: obtaining the information indicating that a shipment or delivery has been placed into the compartment and/or that the compartment has been closed.

In Embodiment 10, provided is a method according to Embodiment 9, wherein the generation of the access authorization information is performed or triggered in reaction to the information only if all of one or more prerequisites linked to the delivery of the shipment or delivery to a recipient are satisfied.

In Embodiment 11, provided is a method according to any of Embodiments 9-10, further comprising: automatically performing or triggering, after the generation of the access authorization information, either the transmission of the access authorization information to a device of a person or the transmission of information to a device of a person.

In Embodiment 12, provided is a method according to one of the preceding Embodiments, further comprising: keeping track of the occupancy status of all the compartments or of a subset of the compartments of the compartment system, by a unit that is external to the compartment system, particularly by a central system that is at least involved in managing a plurality of compartment systems, comprising the compartment system, and/or in generating the access authorization information, wherein a compartment previously regarded as unoccupied is regarded as occupied when access authorization information relating to this compartment is generated, and a compartment previously regarded as occupied is regarded as unoccupied again when, from a device of a person, information indicating that a shipment or delivery included in the compartment has been removed is obtained.

In Embodiment 13, provided is a method according to Embodiment 12, further comprising: selecting, particularly by the external unit, the compartment prior to the generation of the access authorization information at least taking into consideration the tracked occupancy status of all the compartments or of a subset of the compartments of the compartment system, wherein the access authorization information is generated at least using information identifying the selected compartment.

In Embodiment 14, provided is a method according to Embodiment 13, wherein the selection of the compartment is performed taking further into consideration a reservation status of all the compartments or of the subset of the compartments of the compartment system.

In Embodiment 15, provided is a method according to Embodiment 14, wherein a compartment is regarded as reserved when access authorization information requested for this compartment has been generated or generation thereof has been initiated, but still no confirmation has been obtained that the compartment has, particularly after use of the requested access authorization information, been occupied.

In Embodiment 16, provided is a method comprising: obtaining access authorization information at a compartment system, wherein the obtaining of the access authorization information is a necessary condition for access to a compartment from a plurality of compartments of the compartment system to be granted by the compartment system.

In Embodiment 17, provided is a method according to Embodiment 16, wherein at generation of the access authorization information it was already certain which specific compartment from the compartments of the compartment system the compartment is, and the access authorization information has been generated at least using information identifying the compartment, such that the compartment is determinable by the compartment system using the access authorization information, the method further comprising: determining the compartment using the access authorization information.

In Embodiment 18, provided is a method according to Embodiment 16, wherein the compartment system is stateless with respect to the determination of the compartment using the access authorization information.

In Embodiment 19, provided is a method according to one of Embodiments 16-18, wherein the method further comprises: selecting the compartment and outputting the information identifying the selected compartment, so that said information can be used for generating the access authorization information, or enabling selection of the compartment by a person or a device of a person.

In Embodiment 20, provided is a method according to one of Embodiments 16-19, further comprising: providing or outputting an identifier of the compartment system for the purpose of being captured or obtained by a device of a person.

In Embodiment 21, provided is a method according to one of Embodiments 16-20, wherein the access authorization information has been generated such that a limited validity period is associated with the access authorization information, the method further comprising: checking whether a time of the provision of the access authorization information to the compartment system and/or a time of the evaluation of the access authorization information provided to the compartment system by the compartment system is/are within the limited validity period, wherein a further necessary condition for access to the compartment of the compartment system to be granted by the compartment system is that the checking yields a positive result.

In Embodiment 22, provided is a method according to one of Embodiments 16-21, further comprising: checking whether access to the compartment of the compartment system can be granted on the basis of the access authorization information, wherein the access authorization information and the compartment system are onfigured in a way that the compartment system does not need to receive any further information from external units other than the access authorization information in order to perform this checking and/or that the compartment system, for performing this checking, only receives information from that device from which the compartment system receives the access authorization information.

In Embodiment 23, provided is a method according to one of Embodiments 16-22, the method further comprising: outputting information indicating that a shipment or delivery has been placed into the compartment and/or that the compartment has been closed, to a device of a person.

In Embodiment 24, provided is a method comprising: obtaining access authorization information, the provision of which to a compartment system is a necessary condition for access to a compartment from a plurality of compartments of the compartment system to be granted by the compartment system, at a device of a person, and transferring the access authorization information to the compartment system or outputting the access authorization information to the person in order to enable the person to provide the access authorization information to the compartment system.

In Embodiment 25, provided is a method according to Embodiment 24, further comprising: selecting the compartment and outputting the information identifying the selected compartment, so that said information can be used for generating the access authorization information, or enabling selection of the compartment by a person, and outputting the information identifying the selected compartment, so that said information can be used for generating the access authorization information.

In Embodiment 26, provided is a method according to any of Embodiments 24-25, further comprising: capturing or obtaining an identifier of the compartment system, and outputting the captured or obtained identifier of the compartment system, so that said identifier can be taken into consideration for generating the access authorization information.

In Embodiment 27, provided is a method according to one of Embodiments 24-26, further comprising: outputting an enquiry by which the access authorization information is requested, wherein the access authorization information is obtained by virtue of the access authorization information being transferred in reaction to the enquiry, or outputting an enquiry by which the generation of the access authorization information is requested, wherein the access authorization information is obtained by virtue of the access authorization information being requested after the output of the enquiry and the generation of the access authorization information by output of a request.

In Embodiment 28, provided is a method according to one of Embodiments 24-27 further comprising: outputting information indicating that a shipment or delivery has been placed into the compartment and/or that the compartment has been closed, in order to initiate the generation of access authorization information for this compartment.

In Embodiment 29, provided is a computer program comprising program instructions that cause a processor (70, 80) to perform and/or control the method (500, 600, 700, 800) according to one of Embodiments 1-28 when the computer program runs on the processor (70, 80).

In Embodiment 30, provided is an apparatus (7) or system comprising at least two apparatuses, configured to perform and/or control the method (500, 600, 700, 800) according to one of Embodiments 1-28 or comprising respective means for performing and/or controlling the steps of the method (500, 600, 700, 800) according to one of Embodiments 1-28.

The embodiments/exemplary embodiments of the present invention that are described in this specification are also intended to be understood as disclosed in all combinations with one another. In particular, the description of a feature that an embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable. The method steps can be implemented in different ways, and implementation in software (through program instructions), hardware or a combination of the two is conceivable for implementing the method steps. Terms used in the patent claims such as "comprise", "have", "contain", "include" and the like do not exclude further elements or steps. The wording "at least in part" covers both the "in part" case and "completely" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can perform the functions of multiple units or devices cited in the patent claims. Reference symbols specified in the patent claims are not intended to be regarded as limitations for the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus comprising at least one processor and at least one memory that contains program code, wherein the memory and the program code are configured to cause, with the at least one processor, an apparatus to perform and/or control at least:
   obtaining an identifier of a compartment system from a device of a person who wants to gain access to a compartment from a plurality of compartments of the compartment system, wherein the identifier has been captured or obtained by the device and wherein the identifier of the compartment system identifies the compartment system and/or the compartment of the plurality of compartments of the compartment system, and
   generating and/or outputting access authorization information, the provision of which to the compartment system is a necessary condition for access to the compartment from the plurality of compartments of the compartment system to be granted by the compartment system, wherein the access authorization information is generated after the identifier of the compartment system has been captured or obtained by the device of the person and has been obtained from the device of the person, and wherein the identifier of the compartment system is taken into consideration for generating the access authorization information.

2. Apparatus according to claim 1, wherein at generation of the access authorization information it is already certain which specific compartment from the plurality of compartments of the compartment system the compartment is, and wherein the access authorization information is generated at least using information identifying the compartment, such that the compartment is determinable by the compartment system using the access authorization information.

3. Apparatus according to claim 2, wherein the compartment system is stateless with respect to the determination of the compartment using the access authorization information.

4. Apparatus according to claim 1, wherein the compartment is selected before the access authorization information is generated, and the access authorization information is generated at least using information identifying the selected compartment, and wherein the compartment is selected by a person who wants to gain access to the compartment, by a device of the person, by the compartment system or by a central system that is at least involved in managing a plurality of compartment systems, comprising the compartment system, and/or in generating the access authorization information.

5. Apparatus according to claim 1, wherein the generation of the access authorization information is performed or triggered in reaction to an enquriy from a device of a person who needs access to a compartment of the compartment system, and wherein the memory and the program code are further configured to cause, with the at least one processor, an apparatus to perform and/or control:
   transferring or causing the transferring of the access authorization information after its generation in particular automatically to the device, so that provision of the access authorization information by the device or the person to the compartment system is made possible.

6. Apparatus according to claim 1, wherein the generation of the access authorization information is performed or triggered in reaction to information obtained from a device of a person and indicating that a shipment or delivery has been placed into the compartment and/or that the compartment has been closed, in particular by the person, the memory and the program code further configured to cause, with the at least one processor, the apparatus to perform and/or control:
obtaining the information indicating that a shipment or delivery has been placed into the compartment and/or that the compartment has been closed.

7. Apparatus according to claim 6, wherein the generation of the access authorization information is performed or triggered in reaction to the information only if all of one or more prerequisites linked to the delivery of the shipment or delivery to a recipient are satisfied.

8. Apparatus according to claim 1, wherein the memory and the program code are further configured to cause, with the at least one processor, the apparatus to perform and/or control:
keeping track of the occupancy status of all the compartments or of a subset of the compartments of the compartment system, by a unit that is external to the compartment system, particularly by a central system that is at least involved in managing a plurality of compartment systems, comprising the compartment system, and/or in generating the access authorization information, wherein a compartment previously regarded as unoccupied is regarded as occupied when access authorization information relating to this compartment is generated, and a compartment previously regarded as occupied is regarded as unoccupied again when, from a device of a person, information indicating that a shipment or delivery included in the compartment has been removed is obtained.

9. Apparatus according to claim 8, wherein the memory and the program code are configured to cause, with the at least one processor, the apparatus to perform and/or control:
selecting, particularly by the external unit, the compartment prior to the generation of the access authorization information at least taking into consideration the tracked occupancy status of all the compartments or of a subset of the compartments of the compartment system, wherein the access authorization information is generated at least using information identifying the selected compartment.

10. Apparatus according to claim 9, wherein the selection of the compartment is performed taking further into consideration a reservation status of all the compartments or of the subset of the compartments of the compartment system, and wherein a compartment is regarded as reserved when access authorization information requested for this compartment has been generated or generation thereof has been initiated, but still no confirmation has been obtained that the compartment has, particularly after use of the requested access authorization information, been occupied.

11. Apparatus according to claim 1, wherein the access authorization information comprises one or more access authorization parameters and a piece of cryptographic information generated using a first key and the one or more access authorization parameters, wherein one of the one or more access authorization parameters is an identifier of the compartment.

12. Apparatus according to claim 11, wherein the identifier of the compartment system is taken into consideration for generating the access authorization information by virtue of the first key, that is chosen differently for each compartment system, being selected on the basis of the identifier of the compartment system or by virtue of embedding the identifier of the compartment system in the access authorization information.

13. An apparatus comprising at least one processor and at least one memory that contains program code, wherein the memory and the program code are configured to cause, with the at least one processor, an apparatus to perform and/or control at least:
providing or outputting an identifier of a compartment system for the purpose of being captured or obtained by a device of a person who wants to gain access to a compartment from a plurality of compartments of the compartment system, wherein the identifier of the compartment system identifies the compartment system and/or the compartment of the plurality of compartments of the compartment system,
obtaining access authorization information at the compartment system, wherein the obtaining of the access authorization information is a necessary condition for access to the compartment from the plurality of compartments of the compartment system to be granted by the compartment system, and
wherein the access authorization information is generated after the identifier of the compartment system has been captured or obtained by the device of the person and has been obtained from the device of the person, and wherein the identifier of the compartment system is taken into consideration for generating the access authorization information.

14. Apparatus according to claim 13, wherein at generation of the access authorization information it was already certain which specific compartment from the plurality of compartments of the compartment system the compartment is, and the access authorization information has been generated at least using information identifying the compartment, such that the compartment is determinable by the compartment system using the access authorization information, wherein the memory and the program code are configured to cause, with the at least one processor, the apparatus to perform and/or control:
determining the compartment using the access authorization information.

15. Apparatus according to claim 13, wherein the compartment system is stateless with respect to the determination of the compartment using the access authorization information.

16. Apparatus according to claim 13, wherein the memory and the program code are further configured to cause, with the at least one processor, an apparatus to perform and/or control:
selecting the compartment and outputting the information identifying the selected compartment, so that said information can be used for generating the access authorization information, or
enabling selection of the compartment by a person or a device of a person.

17. Apparatus according to claim 13, wherein the memory and the program code are further configured to cause, with the at least one processor, the apparatus to perform and/or control:
outputting information indicating that a shipment or delivery has been placed into the compartment and/or that the compartment has been closed, to a device of a person.

18. An apparatus comprising at least one processor and at least one memory that contains program code, wherein the memory and the program code are configured to cause, with the at least one processor, an apparatus to perform and/or control at least:
    capturing or obtaining an identifier of a compartment system,
    outputting the captured or obtained identifier of the compartment system, so that said identifier can be obtained and taken into consideration for generating access authorization information,
    obtaining the access authorization information, the provision of which to the compartment system is a necessary condition for access to a compartment from a plurality of compartments of the compartment system to be granted by the compartment system, at a device of a person, and
    transferring the access authorization information to the compartment system or outputting the access authorization information to the person in order to enable the person to provide the access authorization information to the compartment system, wherein the identifier of the compartment system identifies the compartment system and/or the compartment of the plurality of compartments of the compartment system.

19. Apparatus according to claim 18, wherein the memory and the program code are further configured to cause, with the at least one processor, the apparatus to perform and/or control:
    selecting the compartment and outputting the information identifying the selected compartment, so that said information can be used for generating the access authorization information, or
    enabling selection of the compartment by a person, and outputting the information identifying the selected compartment, so that said information can be used for generating the access authorization information.

20. Apparatus according to claim 18, wherein the memory and the program code are further configured to cause, with the at least one processor, the apparatus to perform and/or control:
    outputting information indicating that a shipment or delivery has been placed into the compartment and/or that the compartment has been closed, in order to initiate the generation of access authorization information for this compartment.

21. A method comprising:
    obtaining an identifier of a compartment system from a device of a person who wants to gain access to a compartment from a plurality of compartments of the compartment system, wherein the identifier has been captured or obtained by the device and wherein the identifier of the compartment system identifies the compartment system and/or the compartment of the plurality of compartments of the compartment system, and
    generating and/or outputting access authorization information, the provision of which to the compartment system is a necessary condition for access to the compartment from the plurality of compartments of the compartment system to be granted by the compartment system, wherein the access authorization information is generated after the identifier of the compartment system has been captured or obtained by the device of the person and has been obtained from the device of the person, and wherein the identifier of the compartment system is taken into consideration for generating the access authorization information.

22. The method according to claim 21, wherein at generation of the access authorization information it is already certain which specific compartment from the plurality of compartments of the compartment system the compartment is, and wherein the access authorization information is generated at least using information identifying the compartment, such that the compartment is determinable by the compartment system using the access authorization information.

23. The method according to claim 22, wherein the compartment system is stateless with respect to the determination of the compartment using the access authorization information.

24. A method comprising:
    providing or outputting an identifier of a compartment system for the purpose of being captured or obtained by a device of a person who wants to gain access to a compartment from a plurality of compartments of the compartment system, wherein the identifier of the compartment system identifies the compartment system and/or the compartment of the plurality of compartments of the compartment system,
    obtaining access authorization information at the compartment system, wherein the obtaining of the access authorization information is a necessary condition for access to the compartment from the plurality of compartments of the compartment system to be granted by the compartment system, and
    wherein the access authorization information is generated after the identifier of the compartment system has been captured or obtained by the device of the person and has been obtained from the device of the person, and wherein the identifier of the compartment system is taken into consideration for generating the access authorization information.

25. Method according to claim 24, wherein at generation of the access authorization information it was already certain which specific compartment from the plurality of compartments of the compartment system the compartment is, and the access authorization information has been generated at least using information identifying the compartment, such that the compartment is determinable by the compartment system using the access authorization information, wherein the method further comprise:
    determining the compartment using the access authorization information.

26. Method according to claim 24, wherein the compartment system is stateless with respect to the determination of the compartment using the access authorization information.

27. A method comprising:
    capturing or obtaining an identifier of a compartment system,
    outputting the captured or obtained identifier of the compartment system, so that said identifier can be obtained and taken into consideration for generating access authorization information,
    obtaining the access authorization information, the provision of which to the compartment system is a necessary condition for access to a compartment from a plurality of compartments of the compartment system to be granted by the compartment system, at a device of a person, and
    transferring the access authorization information to the compartment system or outputting the access authorization information to the person in order to enable the person to provide the access authorization information to the compartment system, wherein the identifier of the compartment system identifies the compartment system and/or the compartment of the plurality of compartments of the compartment system.

28. Method according to claim 27, the method further comprising:
selecting the compartment and outputting the information identifying the selected compartment, so that said information can be used for generating the access authorization information, or
enabling selection of the compartment by a person, and outputting the information identifying the selected compartment, so that said information can be used for generating the access authorization information.

29. Method according to claim 27, the method further comprising:
outputting information indicating that a shipment or delivery has been placed into the compartment and/or that the compartment has been closed, in order to initiate the generation of access authorization information for this compartment.

30. A non-transitory computer-readable storage medium storing a computer program comprising program instructions that cause a processor, when the computer program runs on the processor, to perform and/or control:
obtaining an identifier of a compartment system from a device of a person who wants to gain access to a compartment from a plurality of compartments of the compartment system, wherein the identifier has been captured or obtained by the device and wherein the identifier of the compartment system identifies the compartment system and/or the compartment of the plurality of compartments of the compartment system, and
generating and/or outputting access authorization information, the provision of which to the compartment system is a necessary condition for access to the compartment from the plurality of compartments of the compartment system to be granted by the compartment system, wherein the access authorization information is generated after the identifier of the compartment system has been captured or obtained by the device of the person and has been obtained from the device of the person, and wherein the identifier of the compartment system is taken into consideration for generating the access authorization information.

31. The computer-readable storage medium according to claim 30, wherein at generation of the access authorization information it is already certain which specific compartment from the plurality of compartments of the compartment system the compartment is, and wherein the access authorization information is generated at least using information identifying the compartment, such that the compartment is determinable by the compartment system using the access authorization information.

32. The computer-readable storage medium according to claim 31, wherein the compartment system is stateless with respect to the determination of the compartment using the access authorization information.

33. A non-transitory computer-readable storage medium storing a computer program comprising program instructions that cause a processor, when the computer program runs on the processor, to perform and/or control:
providing or outputting an identifier of a compartment system for the purpose of being captured or obtained by a device of a person who wants to gain access to a compartment from a plurality of compartments of the compartment system, wherein the identifier of the compartment system identifies the compartment system and/or the compartment of the plurality of compartments of the compartment system,
obtaining access authorization information at the compartment system, wherein the obtaining of the access authorization information is a necessary condition for access to the compartment from the plurality of compartments of the compartment system to be granted by the compartment system, and
wherein the access authorization information is generated after the identifier of the compartment system has been captured or obtained by the device of the person and has been obtained from the device of the person, and wherein the identifier of the compartment system is taken into consideration for generating the access authorization information.

34. The computer-readable storage medium according to claim 33, wherein at generation of the access authorization information it was already certain which specific compartment from the plurality of compartments of the compartment system the compartment is, and the access authorization information has been generated at least using information identifying the compartment, such that the compartment is determinable by the compartment system using the access authorization information, wherein the program instructions further cause the processor, when the computer program runs on the processor, to perform and/or control:
determining the compartment using the access authorization information.

35. The computer-readable storage medium according to claim 33, wherein the compartment system is stateless with respect to the determination of the compartment using the access authorization information.

36. A non-transitory computer-readable storage medium storing a computer program comprising program instructions that cause a processor, when the computer program runs on the processor, to perform and/or control:
capturing or obtaining an identifier of a compartment system,
outputting the captured or obtained identifier of the compartment system, so that said identifier can be obtained and taken into consideration for generating access authorization information,
obtaining the access authorization information, the provision of which to the compartment system is a necessary condition for access to a compartment from a plurality of compartments of the compartment system to be granted by the compartment system, at a device of a person, and
transferring the access authorization information to the compartment system or outputting the access authorization information to the person in order to enable the person to provide the access authorization information to the compartment system, wherein the identifier of the compartment system identifies the compartment system and/or the compartment of the plurality of compartments of the compartment system.

37. Computer-readable storage medium according to claim 36, wherein the program instructions further cause the processor, when the computer program runs on the processor, to perform and/or control:
selecting the compartment and outputting the information identifying the selected compartment, so that said information can be used for generating the access authorization information, or enabling selection of the compartment by a person, and outputting the information identifying the selected compartment, so that said information can be used for generating the access authorization information.

38. Computer-readable storage medium according to claim 36, wherein the program instructions further cause the processor, when the computer program runs on the processor, to perform and/or control:

outputting information indicating that a shipment or delivery has been placed into the compartment and/or that the compartment has been closed, in order to initiate the generation of access authorization information for this compartment.

* * * * *